(12) United States Patent
Evans, II

(10) Patent No.: US 11,667,383 B2
(45) Date of Patent: Jun. 6, 2023

(54) PAYLOAD DELIVERY AND DROP DEVICE FOR UNMANNED AERIAL VEHICLE FOR AUTOMATIC RELEASE UPON SURFACE CONTACT

(71) Applicant: DroneUp, LLC, Virginia Beach, VA (US)

(72) Inventor: John W. Evans, II, Charleston, SC (US)

(73) Assignee: DroneUp, LLC, Virginia Beach, VA (US)

(*) Notice: Subject to any disclaimer, the term of this patent is extended or adjusted under 35 U.S.C. 154(b) by 0 days.

(21) Appl. No.: 17/553,118

(22) Filed: Dec. 16, 2021

(65) Prior Publication Data
US 2022/0289381 A1    Sep. 15, 2022

Related U.S. Application Data

(63) Continuation of application No. 17/200,686, filed on Mar. 12, 2021, now Pat. No. 11,225,325.

(51) Int. Cl.
*B64D 1/12* (2006.01)
*B64C 39/02* (2023.01)
(Continued)

(52) U.S. Cl.
CPC .............. *B64D 1/12* (2013.01); *B64C 39/024* (2013.01); *B64U 10/13* (2023.01); *B64U 2101/60* (2023.01)

(58) Field of Classification Search
CPC ... B64D 1/02; B64D 1/08; B64D 1/10; B64D 1/12; B64C 2201/128
(Continued)

(56) References Cited

U.S. PATENT DOCUMENTS 9,280,038 B1 * 3/2016 Pan ..................... H04N 23/62
9,688,404 B1 * 6/2017 Buchmueller ........... B64D 1/12
(Continued)

FOREIGN PATENT DOCUMENTS

GB    2522328 A    7/2015
GB    2522328 B *  6/2018    ........... B64C 39/024
(Continued)

OTHER PUBLICATIONS

Amazon Prime Air, service description page, Dec. 7, 2016, retrieved on Feb. 17, 2021 from https://www.amazon.com/Amazon-Prime-Air/b?ie=UTF8&node=8037720011, 5 pages.
(Continued)

*Primary Examiner* — Christopher P Ellis
(74) *Attorney, Agent, or Firm* — Cooley LLP

(57) ABSTRACT

Embodiments of a payload delivery and drop device for an unmanned aerial vehicle, and method of its use are described herein. In some embodiments, an apparatus includes a moveable collar defining a lumen having a centerline, and a rigid bar that has a first portion and a second portion different from the first portion. The first portion of the rigid bar has a centerline and the second portion of the rigid bar has a centerline different from the centerline of the first portion. The second portion of the rigid bar is disposed within the lumen of the collar when the rigid bar is in a first position. The centerline of the first portion of the rigid bar is substantially non-parallel to the centerline of the lumen of the moveable collar when the rigid bar is in the first position. The centerline of the second portion of the rigid bar is substantially non-parallel to the centerline of the lumen when the rigid bar is in the second position.

23 Claims, 11 Drawing Sheets

(51) Int. Cl.
  *B64U 10/13*  (2023.01)
  *B64U 101/60*  (2023.01)
(58) Field of Classification Search
  USPC .................................................. 244/137.4
  See application file for complete search history.

(56) References Cited

U.S. PATENT DOCUMENTS

| | | | |
|---|---|---|---|
| 10,023,297 B1* | 7/2018 | Beckman | G06Q 10/083 |
| 2016/0159496 A1* | 6/2016 | O'Toole | E05B 49/00 |
| | | | 244/110 E |
| 2016/0200438 A1* | 7/2016 | Bokeno | B64F 1/362 |
| | | | 244/2 |
| 2018/0016027 A1* | 1/2018 | Cheatham, III | B64U 30/10 |
| 2018/0107210 A1* | 4/2018 | Harnett | B64D 1/02 |
| 2018/0229843 A1* | 8/2018 | Costanzo | B65G 17/24 |
| 2018/0244389 A1* | 8/2018 | Herlocker | B66C 1/42 |
| 2018/0257781 A1* | 9/2018 | Bellof | B64D 9/00 |
| 2018/0261112 A1* | 9/2018 | O'Brien | H04L 9/30 |
| 2018/0265222 A1* | 9/2018 | Takagi | B64C 13/18 |
| 2019/0034868 A1* | 1/2019 | Konanur | B64D 1/22 |
| 2019/0066032 A1* | 2/2019 | Taveira | B64D 1/02 |
| 2019/0100307 A1* | 4/2019 | Beltman | G05D 1/104 |
| 2019/0291865 A1* | 9/2019 | O'Donnell | B64C 39/024 |
| 2019/0369641 A1* | 12/2019 | Gillett | B64C 37/00 |
| 2020/0031473 A1* | 1/2020 | Martens | B64U 10/00 |
| 2020/0055600 A1* | 2/2020 | Lopez | B64C 39/024 |
| 2020/0140070 A1* | 5/2020 | George | B64D 1/22 |
| 2020/0148360 A1* | 5/2020 | Zhang | B64D 1/22 |
| 2020/0164982 A1* | 5/2020 | Keller | B64D 1/02 |
| 2020/0172241 A1* | 6/2020 | Green | B64C 39/024 |
| 2020/0174478 A1* | 6/2020 | Abdellatif | B64C 39/02 |
| 2020/0180880 A1* | 6/2020 | Gil | A47G 29/22 |
| 2020/0290752 A1* | 9/2020 | Kolosiuk | B60L 53/65 |
| 2020/0317324 A1* | 10/2020 | Youmans | B64C 27/20 |
| 2020/0326700 A1* | 10/2020 | Luecke | G05D 1/0027 |
| 2020/0354057 A1* | 11/2020 | Polus | G06Q 50/30 |
| 2020/0354109 A1* | 11/2020 | Polus | G05D 1/02 |
| 2020/0361634 A1* | 11/2020 | Gil | B64F 5/60 |
| 2021/0114729 A1* | 4/2021 | Ragan | B64D 9/00 |
| 2022/0299296 A1* | 9/2022 | Clelland | F41H 11/02 |

FOREIGN PATENT DOCUMENTS

| | | | |
|---|---|---|---|
| WO | WO-2008085547 A2 * | 7/2008 | ............ B64C 27/10 |
| WO | WO 2017/053392 A1 | 3/2017 | |
| WO | WO-2017053392 A1 * | 3/2017 | ........... B64C 39/024 |
| WO | WO 2017/213837 A1 | 12/2017 | |
| WO | WO-2017213837 A1 * | 12/2017 | ........... B64C 39/024 |
| WO | WO 2018/033812 A1 | 2/2018 | |
| WO | WO-2018033812 A1 * | 2/2018 | ............... A61D 7/00 |
| WO | WO 2008/085547 A2 | 7/2018 | |
| WO | WO 2020/144348 A1 | 7/2020 | |
| WO | WO-2020144348 A1 * | 7/2020 | ........... B64C 39/024 |

OTHER PUBLICATIONS

Hooshion Airdrop System Air Drop Release Delivery Device with Landing Gear Fish Bait Advertising Ring Thrower Air Thrower Drop Device Kit for DJI Mavic 2 Pro/Zoom Drone, Amazon Product Page, retrieved on Feb. 19, 2021 from https://www.amazon.com/Hooshion-Release-Delivery-Advertising-Thrower/dp/B07WLLFBFZ/ref=sr_1_1?dchild=1&keywords=hooshion+airdrop+system+air+drop+release+delivery+device+with+landing+gear+fish+bait+advertising+ring+thrower+air&qid=1616533940&sr=8-1, 8 pages.

"Drone-Sky-Hook Release & Drop for DJI Mavic AIR 2, Product Page, 2017, retrieved on Feb. 19, 2021 from https://www.droneskyhook.com/product-page/drone-sky-hook-release-and-drop-for-dji-mavic-air-2, 3 pages."

* cited by examiner

PAYLOAD DELIVERY AND DROP DEVICE FOR UNMANNED AERIAL VEHICLE FOR AUTOMATIC RELEASE UPON SURFACE CONTACT

CROSS-REFERENCE TO RELATED APPLICATION

This application is a continuation of U.S. patent application Ser. No. 17/200,686, filed Mar. 12, 2021, and titled "PAYLOAD DELIVERY AND DROP DEVICE FOR UNMANNED AERIAL VEHICLE FOR AUTOMATIC RELEASE UPON SURFACE CONTACT" now U.S. Pat. No. 11,225,325, issued Jan. 18, 2022, the entire disclosure of which is incorporated herein by reference.

BACKGROUND

The embodiments described herein relate generally to a payload delivery and drop device for an unmanned aerial vehicle (also referred to herein as a drone) or other delivery system, and more particularly, to a payload delivery and drop device for an unmanned aerial vehicle that can automatically release the payload or package in response to contact with an exterior surface (such as the ground or other delivery surface).

Known drone payload drop devices can require a user to control dropping a payload, for example via a trigger or button on a remote controller for the drone or by directing rotation of the unmanned aerial vehicle to trigger the drop. Further, known payload drop devices often attach the payload to the drop device, such as via a drop cord, drop rings, or the like. In use, portions of such attachment mechanisms and/or release mechanisms (e.g., cords, wires, rings, parachutes, or the like) are released along with the payload, leading to increased overhead costs for drone payload delivery and increased waste with respect to the released parts.

Thus, a need exists for a payload delivery and drop device that can automatically drop the payload upon contact with a delivery surface. A need also exists for a payload delivery and drop device that can release the payload in a manner that no part of the drone or release mechanism is released with the payload.

SUMMARY

Embodiments of a payload delivery and drop device for an unmanned aerial vehicle, or other delivery system, and method of its use are described herein. In some embodiments, an apparatus includes a moveable collar defining a lumen having a centerline, and a rigid bar that has a first portion and a second portion different from the first portion. The first portion of the rigid bar has a centerline and the second portion of the rigid bar has a centerline different from the centerline of the first portion. The second portion of the rigid bar is disposed within the lumen of the collar when the rigid bar is in a first position. The centerline of the first portion of the rigid bar is substantially non-parallel to the centerline of the lumen of the moveable collar when the rigid bar is in the first position. The centerline of the second portion of the rigid bar is substantially non-parallel to the centerline of the lumen when the rigid bar is in the second position.

DETAILED DESCRIPTION

Figure 1:
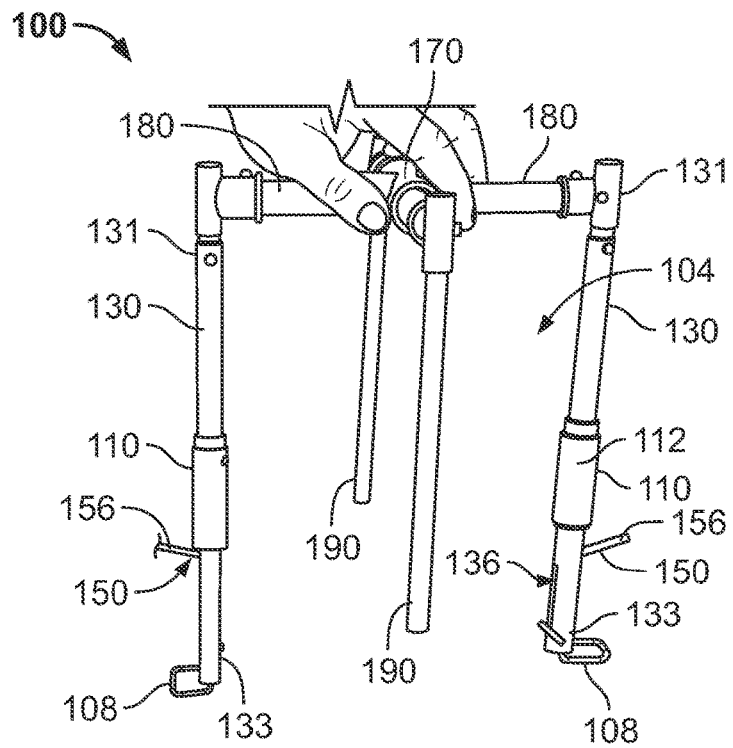
FIG. 1 is a side view of an apparatus, according to an embodiment.

Embodiments of a payload delivery and drop device for an unmanned aerial vehicle (also referred to herein as a drone) or other delivery system, and more particularly, to a payload delivery and drop device for an unmanned aerial vehicle that can automatically release the payload or package in response to contact with an exterior surface (such as the ground or other delivery surface) and/or without releasing any portion of the payload delivery and drop device, or a release mechanism thereof, are described herein.

In some embodiments, an apparatus includes a moveable collar defining a lumen having a centerline, and a rigid bar that has a first portion and a second portion different from the first portion. The first portion of the rigid bar has a centerline and the second portion of the rigid bar has a centerline different from the centerline of the first portion. The second portion of the rigid bar is disposed within the lumen of the collar when the rigid bar is in a first position. The centerline of the first portion of the rigid bar is substantially non-parallel to the centerline of the lumen of the moveable collar when the rigid bar is in the first position. The centerline of the second portion of the rigid bar is substantially non-parallel to the centerline of the lumen when the rigid bar is in the second position.

In some embodiments, during use, the first portion of the rigid bar at least partially retains a payload to the apparatus when the rigid bar is in the first position, and the rigid bar permits the payload to be at least one of disposed in or released from the apparatus when the rigid bar is in the second position. The moveable collar can have a first (or retention) position in which the rigid bar is in its first position and a second (or release) position in which the rigid bar is in its second position. In some embodiments, the moveable collar prevents movement of the rigid bar from its first position to its second position when the moveable collar is in its first position. The moveable collar can move from its first position to its second position in response to a force produced when a portion of the apparatus contacts an external surface. The rigid bar can be configured to automatically move from its first position to its second position, in response to the moveable collar moving from its first position to its second position. When the moveable collar moves from its first position to its second position, the rigid bar can move from its first position to its second position in response to at least one of a weight of the payload received by the apparatus or a magnetic attraction of a portion of the rigid bar to a magnetized portion of the apparatus. The moveable collar can define a channel in fluid communication with the lumen of the collar. The first portion of the rigid bar can be extended through the channel when the rigid bar is in its first position.

In some embodiments, the apparatus also includes an elongate, rigid tube having a lumen. The rigid bar can be coupled to the elongate, rigid tube, for example, at a pivot point of the rigid bar. The pivot point of the rigid bar can be disposed within the lumen of the elongate, rigid tube.

A portion of the elongate, rigid tube can be disposed within the lumen defined by the moveable collar. The moveable collar can be slidable with respect to the elongate, rigid tube to move from its first position to its second position.

The apparatus can also include a hub configured to be coupled to a delivery system (e.g., an unmanned aerial vehicle), a plurality of radially extending arms extended from the hub, and a plurality of elongate, rigid tubes coupled to the plurality of radially extending arms such that the plurality of elongate, rigid tubes are non-parallel to the plurality of radially extending arms. The plurality of radially extending arms, the plurality of elongate, rigid tubes, and the first portion of the rigid bar (and optionally first portions of a plurality of rigid bars) can collectively define, in part, a volume within which a payload is received during use. At least one of a radially extending arm from the plurality of radially extending arms or an elongate, rigid tube from the plurality of elongate, rigid tubes can have an adjustable length.

The moveable collar can define a channel in fluid communication with the lumen. The first portion of the rigid bar can be extended through the channel when the rigid bar is in its first position.

In some embodiments, the apparatus further includes a tube that defines a lumen, which tube can be elongate and/or substantially rigid. The moveable collar can disposed about the tube such that the tube and the collar are substantially coaxial when the moveable collar is in a first position with respect to the tube and when the moveable collar is in a second position with respect to the tube.

In some embodiments, an apparatus according to an embodiment includes an elongate collar that has a lumen and that defines a channel in fluid communication with the lumen. The elongate collar has a first position and a second position and is configured to move from its first position to its second position in response to a force produced when a portion of the apparatus contacts an external surface during use. The apparatus also includes a rigid rod having a first portion and a second portion different than the first portion. The first portion of the rigid rod has a centerline and the second portion of the rigid rod has a centerline that intersects the centerline of the first portion of the rigid rod at a non-zero angle. The rod is configured to pivot about a pivot point disposed proximate to, for example within or at the angle of intersection, the intersection of the centerline of the second portion of the rigid rod with the centerline of the first portion of the rigid rod. The rigid rod has a first position in which the first portion of the rigid rod is extended through the channel of the elongate collar and the second portion of the rigid rod is at least partially disposed within the lumen of the elongate collar. During use, the elongate collar retains the rigid rod in its first position when the elongate collar is in its first position. Also during use, the rigid rod moves freely to its second position when the elongate collar is in its second position.

In some embodiments, the apparatus can also include a tube that defines a lumen extended at least partially therethrough. The tube can be elongate and substantially rigid. A wall of the tube can define a first channel in fluid communication with the lumen of the tube and a second channel in fluid communication with the lumen of the tube. The second channel of the tube can be distinct from the first channel of the tube. The tube can be at least partially received within the lumen of the elongate collar. The elongate collar, in its first position, can be disposed about the tube at a first location of the tube such that (1) the channel of the elongate collar at least partially overlays and is in fluid communication with the first channel of the tube, and (2) the body portion of the elongate collar at least partially covers the second channel of the tube. The elongate collar, in its second position, can be disposed about the tube at a second location of the tube such that the elongate collar is spaced apart from the first channel of the tube and from the second channel of the tube.

In some embodiments, when the rigid rod is in its second position, the second portion of the rigid rod is extended through the second channel of the tube and the first portion of the rigid rod is disposed within the lumen of the tube. The tube can include a magnet configured to magnetically attract a portion of the rigid rod to retain the rigid rod in its second position, when the elongate collar is in its second position. The elongate collar can be slidingly movable from its first position to its second position with respect to the tube. The elongate collar can be disposed substantially about a perimeter of the tube. The elongate collar can be coupled to a footing extended distally with respect to the collar. The footing, during use, can contact the external surface and can transfer a force generated by the contact to move the elongate collar from its first position to its second position.

In some embodiments, the channel of the elongate collar includes a mouth portion that is wider than an elongate portion of the channel of the elongate collar. The body or wall portion of the elongate collar that defines the mouth portion can be angled inwardly towards the elongate portion of the channel.

In some embodiments, the apparatus includes a plurality of elongate collars, and the elongate collar is a first elongate collar from the plurality of elongate collars. The plurality of elongate collars can define, in part, a perimeter of a volume of the apparatus, which volume is configured to releasably receive a payload therein. The channel of the first elongate collar can face a portion of the volume. The apparatus can also include a plurality of rigid rods, and the rigid rod can be a first rigid rod from the plurality of rigid rods. The plurality of rigid rods can define, in part, a distal boundary of a volume of the apparatus, which volume can be configured to releasably receive a payload therein.

As used in this specification and the appended claims, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein, unless the context clearly dictates otherwise, the words "proximal" and "distal" refer to a direction closer to and away from, respectively, an unmanned aerial vehicle for carrying the device. Thus, for example, the end of the device configured to be attached to the unmanned aerial vehicle would be the proximal end of the device, while the end opposite the proximal end, and configured to contact a delivery surface (e.g., the ground) would be the distal end of the device. The words "proximal" and "distal" can also refer, if the context so indicates, to a direction closer to and away from, respectively, a hub of the device.

As used herein, the terms "reversible," "reversibly," and/or the like when used to described a process and/or procedure generally refer to a non-destructive process or procedure that can be subsequently undone by a similar yet substantially opposed, inverse, and/or opposite non-destructive process or procedure. When used herein with respect to attachment and/or detachment of an element or assembly, a reversible attachment refers to a non-destructive, repeatable attachment and/or detachment of the element or assembly.

As used herein, the terms "about" and/or "approximately" when used in conjunction with numerical values and/or ranges generally refer to those numerical values and/or ranges near to a recited numerical value and/or range. For example, in some instances, "about 40 [units]" can mean within ±25% of 40 (e.g., from 30 to 50). In some instances, the terms "about" and "approximately" can mean within ±10% of the recited value. In other instances, the terms "about" and "approximately" can mean within ±9%, ±8%, ±7%, ±6%, ±5%, ±4%, ±3%, ±2%, ±1%, less than ±1%, or any other value or range of values therein or therebelow. The terms "about" and "approximately" may be used interchangeably. Furthermore, although a numerical value modified by the term "about" or "approximately" can allow for and/or otherwise encompass a tolerance of the stated numerical value, it is not intended to exclude the exact numerical value stated.

In a similar manner, term "substantially" when used in connection with, for example, a geometric relationship, a numerical value, and/or a range is intended to convey that the geometric relationship (or the structures described thereby), the number, and/or the range so defined is nominally the recited geometric relationship, number, and/or range. For example, two structures described herein as being "substantially non-parallel" is intended to convey that, although a non-parallel geometric relationship is desirable, some parallelism can occur in a "substantially non-parallel" arrangement. By way of another example, a structure defining a diameter that is "substantially 100 millimeters (mm)" is intended to convey that, while the recited diameter is desirable, some tolerances can occur when the volume is "substantially" the recited volume (e.g., 100 mm). Such tolerances can result from manufacturing tolerances, measurement tolerances, and/or other practical considerations (such as, for example, minute imperfections, age of a structure so defined, a pressure or a force exerted within a system, and/or the like). As described above, a suitable tolerance can be, for example, of ±1%, ±2%, ±3%, ±4%, ±5%, ±6%, ±7%, ±8%, ±9%, ±10%, or more of the stated geometric construction, numerical value, and/or range. Furthermore, although a numerical value modified by the term "substantially" can allow for and/or otherwise encompass a tolerance of the stated numerical value, it is not intended to exclude the exact numerical value stated.

While numerical ranges may be provided for certain quantities, it is to be understood that these ranges can include all subranges therein. Thus, the range "from 45 to 135" includes all possible ranges therein (e.g., 46-134, 47-133, 48-132, 49-131, . . . , 89-91, etc.). Furthermore, all values within a given range may be an endpoint for the range encompassed thereby (e.g., the range 45 to 135 includes the ranges with endpoints such as 90-135, 45-90, etc.).

The apparatus described herein can be used, for example, in delivery and drop of a payload or package via an unmanned aerial vehicle, and more specifically for automatic release of the payload from the apparatus upon contact of the apparatus with an external surface, such as the ground or other delivery surface. In another example, the apparatus described herein can also or alternatively be used with, or coupled to, a manned delivery vehicle, a non-aerial delivery vehicle, a crane, robotic arm (e.g., on an aerial delivery vehicle, a land-based vehicle such as a truck, or a water-based vehicle such as a boat), or other movable delivery system.

An apparatus 100 according to an embodiment is illustrated in FIGS. 1-7. The apparatus 100 can be, for example, a payload delivery and drop device that is coupleable to an unmanned aerial vehicle (also referred to herein as a drone) and which is configured to deliver and drop a payload (or package or the like). The device 100 can be coupled to the drone (not shown) via any suitable coupling mechanism, including, for example by a cord or cable attached at one end portion to the drone and at another end portion to the payload delivery and drop device. Such a cord, cable, or other coupler can be attached (e.g. releasably attached), for example, to an eye hook 178 or the like disposed at a proximal end portion of the device 100, such as on a hub 170 of the device 100. In some embodiments, the hub 170 can be directly coupled to the drone (e.g., the hub can be directly bolted, screwed or otherwise attached to an underside of the drone).

The device 100 is configured to releasably receive a payload 10 within a volume 104 defined by the device. The volume 104 can be collectively defined in part, for example, by one or more of the hub 170, one or more arms 180 that extend (e.g., radially) from the hub 170, one or more elongate tubes 130 coupled to one or more of the arms 180, one or more elongate rods 190 coupled to one or more of the arms 180, and one or more retention pins (which can be or include, for example, rigid bars or rods) 150 coupled to one or more of the elongate tubes 130, or a combination thereof. During use, the device 100 is configured to releasably receive the payload 10 within the volume and to retain the payload 10 within the volume, as described in more detail herein. The device 100 is configured to release the payload 10 from the volume 104 in response to the device 100 contacting a delivery surface, such as the ground, a delivery pad, a rooftop, or other surface exterior to the device, as described in more detail herein.

The volume 104 can be bound, in part, on a proximal end thereof by the hub 170 and radially extending arms 180, which can be coupled to the hub 170 in any suitable manner. For example, as shown in FIG. 1, first (or proximal) end portions of the arms 180 can be received in openings of the hub 170. Second (or distal) end portions of at least a subset of the arms 180 are coupled to respective elongate tubes 130, e.g., at proximal end portions 131 of the elongate tubes 130, such that the elongate tubes are non-parallel to the radially extending arms 180. Second (or distal) end portions of at least another subset of the arms 180 can be coupled to respective retention rods 190, e.g., at proximal end portions thereof, such that the retention rods 190 are non-parallel to the radially extending arms 180, as described in more detail herein.

Figure 5:
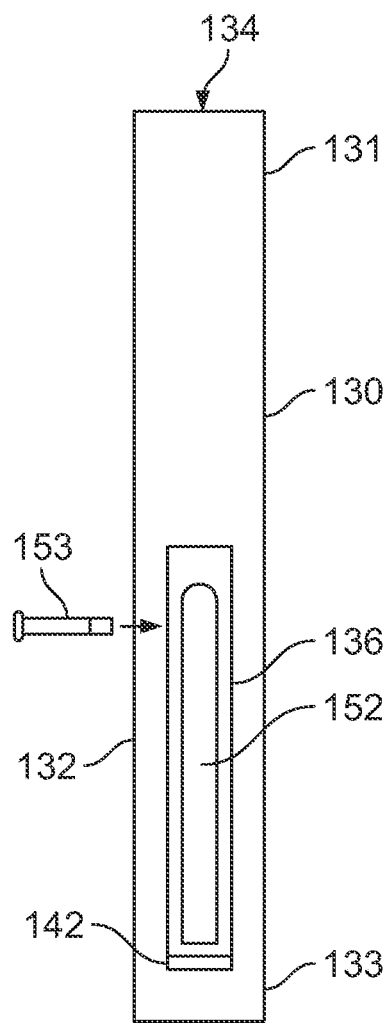
FIG. 5 is a front view of a portion of the apparatus of FIG. 1.
Figure 6:
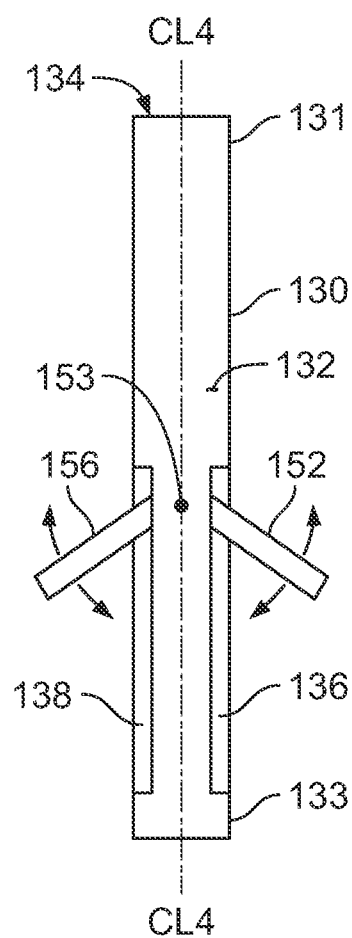
FIG. 6 is a side view of the portion of the apparatus of FIG. 5.
Figure 7:
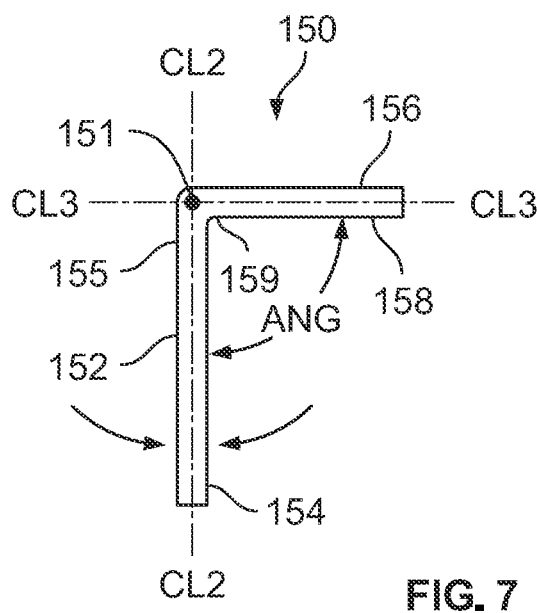
FIG. 7 is a side view of a portion of the apparatus of FIG. 1.

The elongate tubes 130 each extends distally with respect to their respective arms 180 to bound, at least in part, a perimeter of the volume 104. The elongate tubes 130 can be substantially similar or identical, and so only one tube 130 is described herein. The elongate tube 130 can be substantially rigid. As shown in FIGS. 5-6, the elongate tube 130 has a distal end portion 133 opposite the proximal end portion 131, and defines a lumen 134 extended at least partially therethrough. The elongate tube 130 defines a centerline CL4, which can be perpendicular to or otherwise intersecting with a centerline of the arm 180 to which it is coupled.

Figure 4:
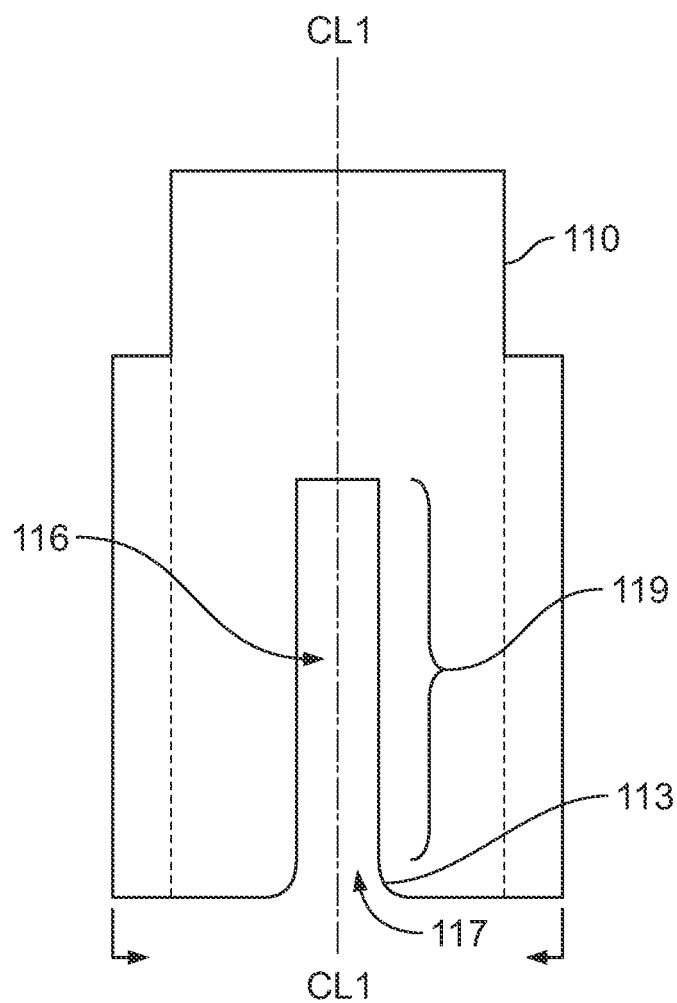
FIG. 4 is a front view and a top view of a portion of the apparatus of FIG. 1.
Figure 4:
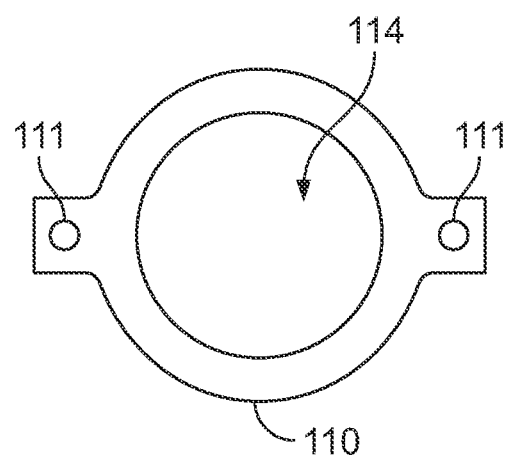

The device 100 includes a collar 110 that has a lumen 114 (see, e.g., FIG. 4). The lumen 114 can be open at each end of the collar 110. The collar 110 can be elongate, for example, in the shape of an elongate cylinder. The collar 110 operates as an actuator to release the payload from the volume 104, as described in more detail herein. The collar 110 is coupled to the tube 130, and more specifically, the tube 130 is at least partially received or disposed within the lumen 114 of the collar 110. In this manner, the collar 110 is disposed about a portion of a perimeter of the elongate tube 130. The collar 110 can have a centerline that is substantially coaxial with the centerline of the elongate tube 130.

Figure 20:
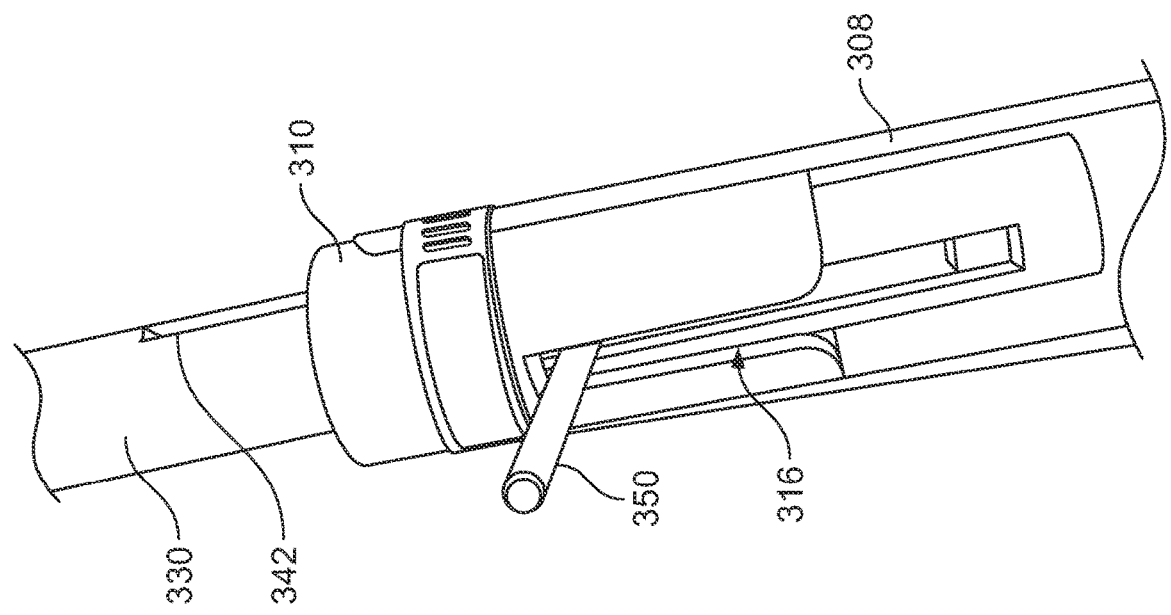
FIG. 20 is a perspective view of a portion of the apparatus of FIG. 18.

The collar 110 is movable from a first position (see, e.g., FIG. 3) to a second position (see, e.g., FIGS. 1-2), and vice versa. The collar 110 can be, for example, slidable with respect to the tube 130. In some embodiments, tube 130 defines a guide channel (not shown in FIGS. 1-3, but which can be similar to a guide channel 342 shown with respect to tube 330 in FIG. 20), and a protrusion (not shown) of the collar 130 is slidably received within the guide channel. In this manner, the interaction of the protrusion of the collar and the guide channel can operate to limit movement of the collar 130 with respect to the tube in the proximal direction and the distal direction. Also in this manner, the interaction of the protrusion of the collar and the guide channel can operate to prevent rotational movement of the collar 110 with respect to the tube 130 (e.g., when the collar 110 is in its second position).

The collar 110 is configured to move from its first position to its second position in response to a force produced when a portion of the apparatus, such as a footing 108 coupled to and extended distally with respect to the collar 110, contacts an external surface during use. For example, when the payload delivery and drop device is in sufficiently close proximity to the delivery surface that the footing 108 contacts the delivery surface, a force produced by the contact of the footing with the delivery surface causes the footing to move in a proximal direction, and thus moves the collar 110 coupled to the footing 108 in the proximal direction to its second position. In some embodiments, release of the payload 10 from the volume 104 can be triggered by a single collar 110 being moved from its first position to its second position. In some embodiments, two or more collars 110 are moved from their respective first positions to their respective second positions to release (or drop) the payload 10 from the volume 104. The collar 110 can include one, two (e.g., as shown in FIG. 4), three or more sleeves 111 on an outer surface of the collar 110, which sleeve is configured to receive a portion of an elongate rod of the footing 108 therein to retain the footing to the collar 110.

The collar 110 defines a channel 116 in fluid communication with the lumen 114. The channel 116 of the collar can be elongate and extend substantially parallel to the centerline of the collar 110. The channel 116 of the collar 110 faces at least a portion of the volume 104. The channel 116 of the collar includes a mouth portion 117 that is wider than an elongate portion 119 of the channel 116. The mouth portion 117 is defined on either side (or at least one side) of the channel 116 by a sloped, eased edge, angled or rounded corner 113 of the wall (or body) portion 112 of the collar 110 that is sloped, eased, angled or rounded inwardly towards the elongate portion 119 of the channel 116. The wider mouth portion 117 helps to direct a first portion 152 of the rigid bar 150 into the channel 116 when the collar 110 is moved from its second position to its first position, as described in more detail herein.

The elongate collar 110, in its first position (see, e.g., FIG. 3), is disposed about the tube 130 at a first location of the tube such that the channel 116 of the elongate collar 110 at least partially overlays and is in fluid communication with a first channel 136 defined by a wall or body portion 132 of the tube 130. The first channel 136 of the tube is in fluid communication with the lumen 134 (see, e.g., FIG. 5-6) of the tube 130. Thus, when the elongate collar 110 is in its first position, the channel 116 of the elongate collar 110 is also in fluid communication with the lumen 134 of the tube 130.

The elongate collar 110, in its first position, is also disposed about the tube 130 at the first location such that the body (or wall) portion 112 of the elongate collar 110 at least partially covers or is disposed overlaying a second channel 138 of the tube 130. The second channel 138 is in fluid communication with the lumen 134 of the tube 130. The second channel 138 of the tube 130 is distinct from the first channel 136 of the tube 130. The second channel 138 can be located on the tube 130 opposite (e.g., across a diameter of tube from) the first channel 136.

The elongate collar 110, in its second position (see, e.g., FIGS. 1-2), is disposed about the tube 130 at a second location of the tube 130 proximal to the first location, such that the elongate collar 110 is spaced apart from (e.g., not overlaying) each of the first channel 136 and the second channel 138 of the tube 130. The tube 130 and the collar 110 can be substantially coaxial when the collar 110 is in its first position with respect to the tube 130 and when the moveable collar 110 is in its second position with respect to the tube 130.

As shown in FIGS. 5-6, the rigid bar (or rod) 150 is coupled to the elongate tube 130. For example, the rigid bar 150 can be coupled to the elongate tube 130 at a pivot point 151 (see FIG. 6), such as via a pivot pin 153 (see FIGS. 5 and 7) extended at least partially through the wall portion 132 of the tube 130. The pivot point 151 of the rigid bar 150, and optionally a portion of pivot pin 153, can be disposed within the lumen 134 of the tube 130. The rigid bar 150 has a first portion 152 and a second portion 156 different from the first portion. The first portion 152 of the rigid bar 150 has a centerline CL2 and the second portion 156 of the rigid bar has a centerline CL3 different from the centerline CL2 of the first portion. In some embodiments, for example, the first and second portions 152, 156 of the rigid bar 150 can form a substantially L or V-shape. The centerline CL3 of the second portion 156 can intersect the centerline CL2 of the first portion 152 of the rigid bar 150 at a non-zero angle. For example, at an angle within the range of about 45 degrees to about 135 degrees, or within the range of about 80 degrees to about 100 degrees, or at about 90 degrees. The pivot point 151 about which the rigid bar (or rod) 150 is configured to pivot can be disposed within the angle of intersection of the centerlines CL2, CL3 of the first and second portions 152, 156 of the rigid bar 150, or it can be disposed at the intersection of the centerlines CL2, CL3.

Figure 2:
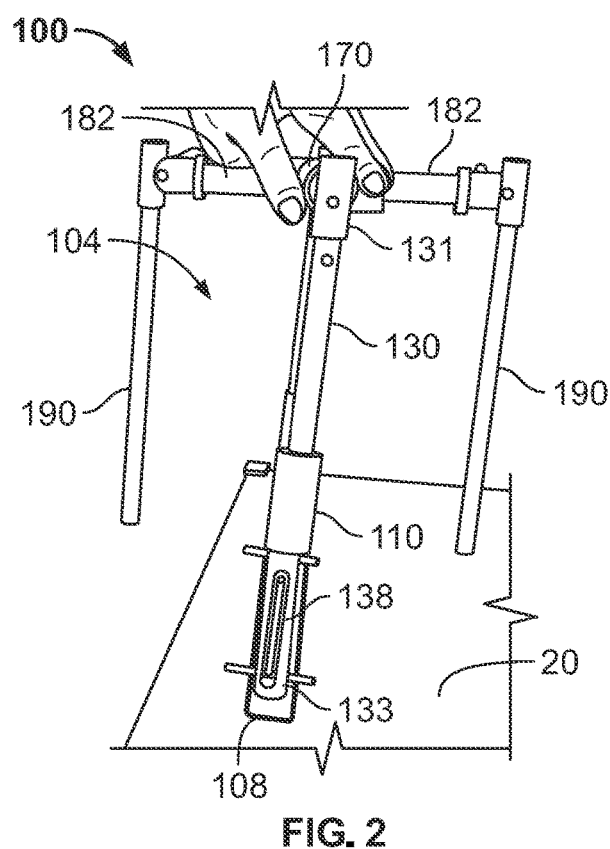
FIG. 2 is a front view of the apparatus of FIG. 1, in a first configuration.

The rigid bar 150 has a first (or retention) position (see, e.g., FIG. 3) and a second (or release) position (see, e.g., FIGS. 1-2 and 5). The second portion 156 of the rigid bar 150 is at least partially disposed within the lumen 114 of the collar 110, and also within the lumen 134 of the tube 130, when the rigid bar 150 is in its first position. Also when the rigid bar 150 is in its first position, the centerline CL2 of the first portion 152 of the rigid bar 150 is substantially non-parallel to the centerline CL1 of the lumen 114 of the moveable collar 114 (and to the centerline CL4 of the lumen 134 of the tube 130). For example, the first portion 152 of the rigid bar 150 can be substantially perpendicular to the centerline CL4 of the tube 130 and/or the collar 110, when the rigid bar 150 is in its first position. The first portion 152 of the rigid bar 150 is extended through the first channel 136 of the tube 130 and through the channel 116 of the collar 110, when the rigid bar 150 is in its first position. In this manner, the first portion 152 of the rigid bar 150 defines a lower boundary of the volume 104, when the rigid bar 150 is in its first position. As such, during use, the first portion 152 of the rigid bar 150 can at least partially retain the payload 10 to the apparatus 100, e.g., within the volume 104, when the rigid bar 150 is in the first position.

The rigid bar 150 moves from its first position to its second position by pivoting about the pivot point 151. When the rigid bar 150 is in its second position, the centerline CL3 of the second portion 156 of the rigid bar 150 is substantially non-parallel to the centerline CL1 of the lumen 114. For example, the second portion 156 of the rigid bar 150 can be substantially perpendicular to the centerline CL4 of the tube 130 and/or the collar 110, when the rigid bar 150 is in its second position. The rigid bar 150 permits the payload 10 to be at least one of disposed (or received) in, or released from, the device 100 when the rigid bar 150 is in the second position.

The collar 110 has a first position in which the rigid bar 150 is in its first position and a second position in which the rigid bar 150 is in its second position. In its first position, the moveable collar 110 prevents movement of the rigid bar 150 from its first position to its second position. Said another way, during use, the collar 110 retains the rigid bar 150 in its first position when the collar 110 is in its first position. The moveable collar 110 does not, however, prevent movement of the rigid bar 150 from its first position to its second position when the collar 110 is in its second position. In other words, when the collar 110 is moved proximally away from its first position and to or towards its second position, the collar 110 is no longer disposed over the second channel 138 of the tube 130, and so the rigid bar (or rod) 150 can pivot about its pivot axis 151 to move the rigid bar 150 to its second position. As such, during use, the rigid bar 150 can move freely to its second position when the collar 110 is in its second position. When the rigid bar 150 is in its second position, the second portion 156 of the rigid bar 150 is extended through the second channel 138 of the tube 130. Also when the rigid bar 150 is in its second position, the first portion 152 of the rigid bar 150 is disposed within the lumen 134 of the tube 130. The rigid bar 150 can be configured to automatically move from its first position to its second position, in response to the moveable collar 110 moving from its first position to its second position.

When the collar 110 moves from its first position to its second position, the rigid bar 150 can move from its first position to its second position in response to at least one of a weight of the payload 10 received by the apparatus 100 (e.g., in the volume 104) and/or a magnetic attraction of a portion of the rigid bar 150 to a magnetized portion of the device 100. In some embodiments, for example, the rigid bar 150 is constructed, at least in part, of a ferromagnetic metal and the tube 130 includes a magnet 142 (schematically illustrated in FIG. 5) positioned with respect to the tube such that the magnetic attraction of the rigid bar 150 causes the rigid bar 150 to tend towards its second position. The magnet 142 can be located, for example, within the lumen 134, within the first channel 136 or the second channel 138 (e.g., towards a distal end portion thereof), on a surface of the tube 130 proximate the distal end portion of one of the channels 136, 138, or at a distal end portion of the tube 130. In some embodiments, the rigid bar 150 can be constructed of magnesium or other suitable material, and can include a steel tip portion that is configured to magnetically engage with the magnet 142. In some embodiments, the first portion 152 of the rigid bar 150 has a length greater than a length of the second portion 156 of the rigid bar 150. In this manner, the first portion 152 of the rigid bar 150 can extend more closely to the magnet 142 than the second portion 156 of the rigid bar.

Figure 3:
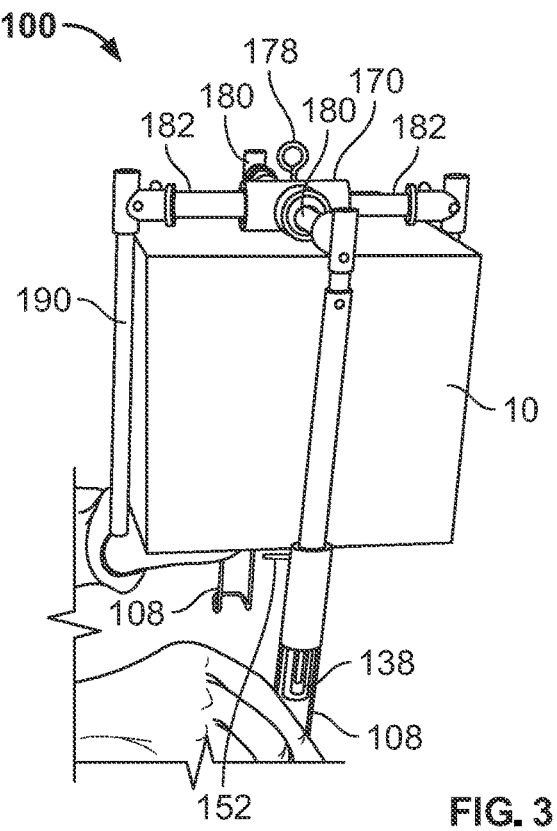
FIG. 3 is a front view of the apparatus of FIG. 1, in a second configuration.

The payload delivery and drop device 100 as shown in FIGS. 1-3 includes two tubes 130, each with a moveable, elongate collar 110 and rigid bar (or rod) 150 coupled thereto, which tubes 130 (and thus the collars 110 and rigid bars 150) are positioned at opposing sides of the hub 170. The device 100 also optionally includes elongate rods 190 coupled to a subset (e.g., two as shown in FIGS. 1-3) of arms 182 such that the elongate rods 190 extend distally with respect to the arms 182. The elongate rods 190 can define, in part, a portion of the perimeter of the volume 104. The elongate rods 190 prevent the payload 10 received in the volume 104 from moving laterally out of the volume between the elongate tubes 130. In some embodiments, one or more of the rods 190 has an adjustable length.

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made. Although various embodiments have been described as having particular features and/or combinations of components, other embodiments are possible having any combination or sub-combination of any features and/or components from any of the embodiments described herein. Further, although methods have been described herein in reference to a specific embodiment, the methods can be executed using any suitable device embodiment described herein.

For example, while the arms 180 and tubes 130 are shown in FIGS. 1-3 as being substantially perpendicular (e.g., with the arms extended along a substantially horizontal axis and with the tubes 130 being extended along a substantially vertical axis, relative to a ground surface when the drone is positioned or flying parallel to the ground), in other embodiments, the arms and tubes can define a different interior (i.e., facing the volume) angle. For example, in other embodiments, an arm and a tube can be coupled to form an interior angle within the range of about 45 degrees to about 135 degrees. In such embodiments, the arm can have a centerline that intersects the horizontal axis, the tube can have a centerline that intersects the vertical axis, or both.

Figure 8:
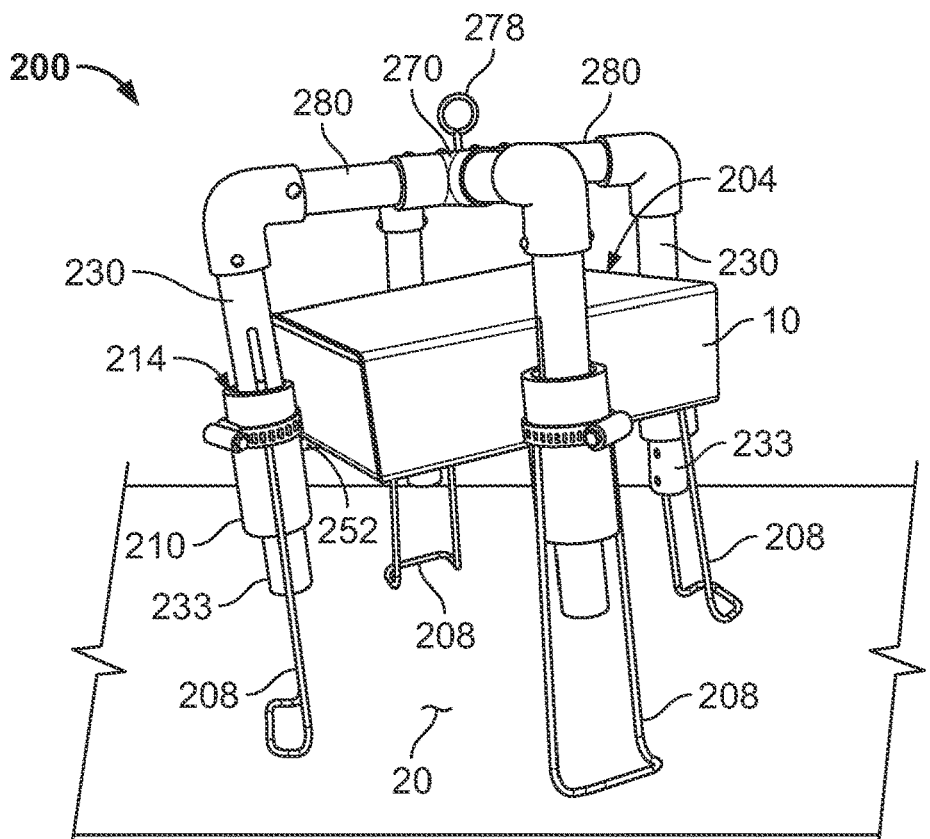
FIGS. 8-11 are front perspective views of an apparatus, according to an embodiment, in a first, second, third and fourth configuration, respectively.
Figure 9:
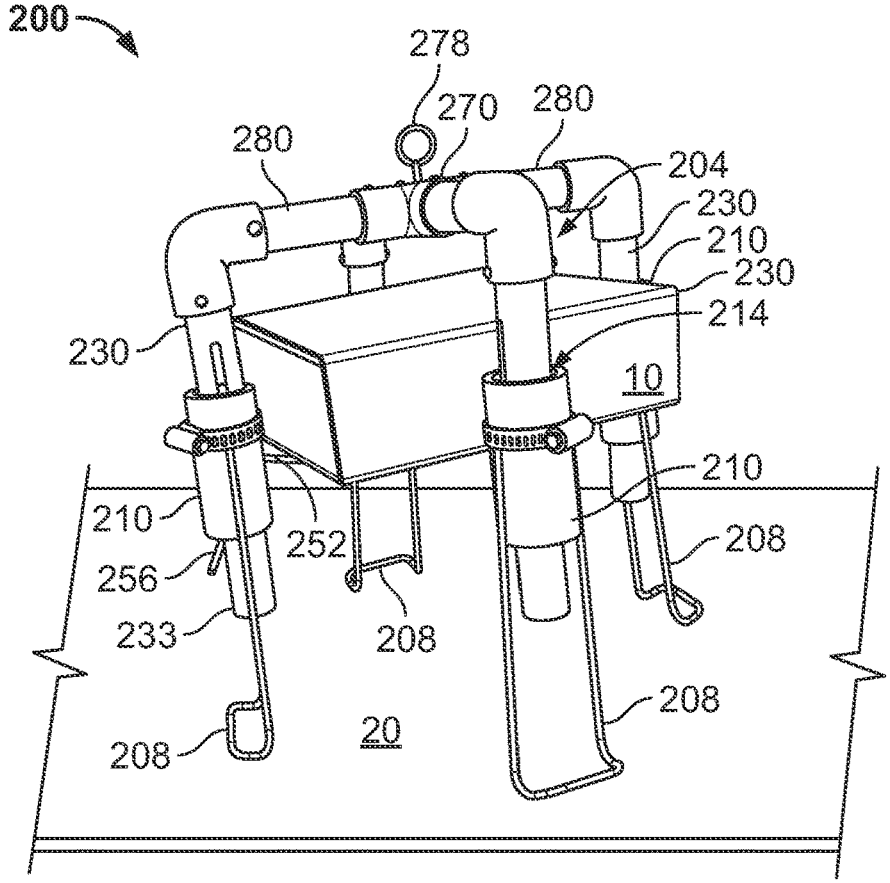
Figure 10:
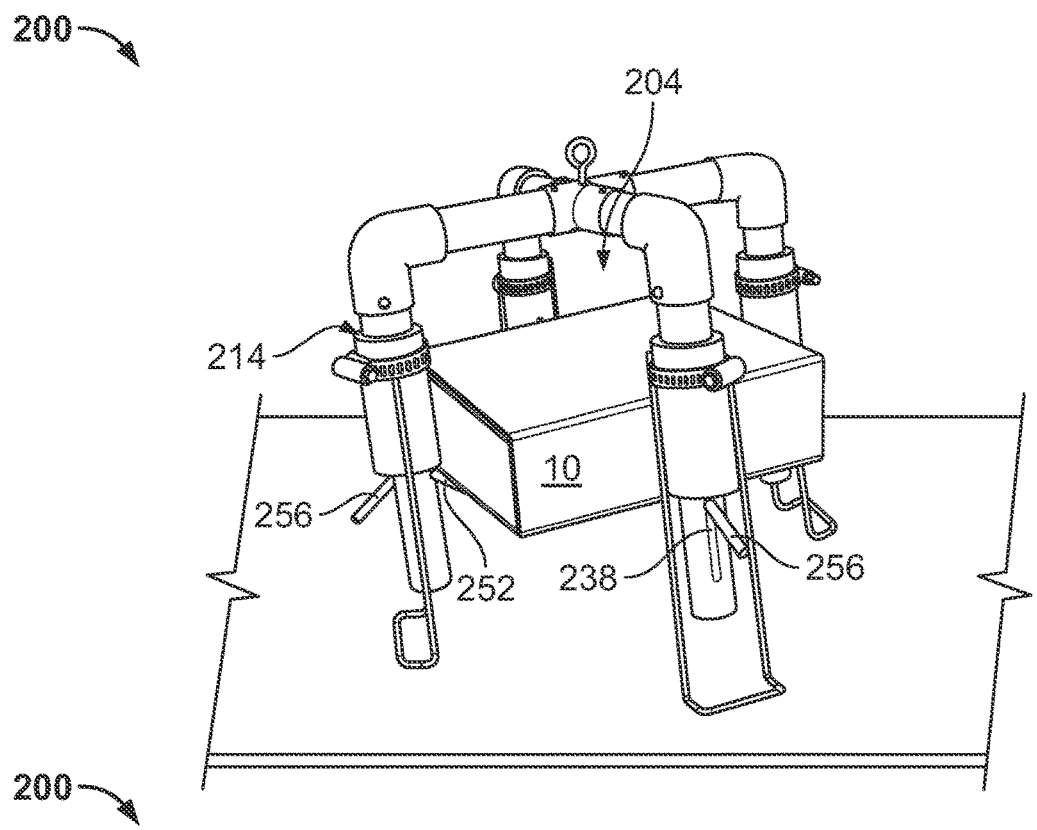

In another example, although the payload delivery and drop device 100 is shown and described herein as including two tubes 130 each with a collar 110 and rigid bar 150 configured to selectively retain the payload to the device, in other embodiments, the delivery device 100 can include any suitable number of tubes, collars and/or rigid bars, including, but not limited to, one, three, four or more tubes, collars and/or rigid bars. For example, a payload delivery and drop device 200 according to an embodiment is shown in FIGS. 8-10. The device 200 can be similar in many respects, or identical to, the payload delivery and drop devices described herein (e.g., device 100, 300) and can include features similar in many respects, or identical to features of the payload delivery and drop devices described herein. As such, the device 200 and its features are not described in detail herein.

The device 200 includes a hub 270, a set of arms 280 extending radially from the hub 270, and a set of four elongate tubes 230 coupled to and extending distally with respect to the arms 280. Each tube 230 is received within a lumen 214 defined by a collar 230. Each tube 230 also has a rigid bar (or rod) 250 pivotally coupled thereto, such that the rigid bar 250 can move from a first position in which the rigid bar 250 retains a payload 10 within a volume 204 of the apparatus to a second position in which the payload 10 can be released from the volume (or optionally, loaded into the volume).

In use, the rigid rods 250 are moved to their second position, such that a first portion 252 of each rod 250 is disposed within a lumen (not shown) of each tube 230. The rigid rods 250 can be retained in the second position by a magnet (not shown) coupled to the tubes 230, or a magnetized portion of the tubes 230. A payload 10 is loaded into the volume 204 of the device 200. At least one moveable collar 210 is moved from its second position to its first position, such that at least one rigid rod 250 is moved from its second position to its first position. In this manner, the payload 10 is retained in the volume 204 of the apparatus, collectively, by the rigid rods 250, elongate tubes 230, and arms 280 (and optionally, the hub 270). An unmanned aerial vehicle (drone; not shown) can be coupled to the device 200, such as by attaching the vehicle to the eye hook or loop 278 of the device 200. The drone can be flown to the desired delivery location and optionally vertically aligned with a desired delivery or exterior surface (e.g., the ground, concrete, a rooftop, a delivery pad, or the like). The drone lowers the device 200 towards the delivery surface such that a footing 208 coupled to the collar 210 (or a distal end portion of the collar in some embodiments) engages the delivery surface. A force produced in response to contact of the footing 208 (or collar 210) with the delivery surface causes the collar 210 to move in a proximal direction from its first position to its second position, thereby releasing its restraint on the pivotable rigid rod 250. The rigid rod 250 moves from its second position to its first position, which releases the lower boundary of the volume 204 within which the payload 10 is received and so the payload 10 is dropped or released from the volume 204. In this manner, the device 200 is configured to deliver the payload 10 while the delivery vehicle or system (e.g., a drone, or other delivery vehicle or system described herein) remains in the air during release of the payload 10. The payload 10 can be released without any release or attachment mechanism, or other portion of the device 200 (e.g., a tether, chain, strap, or the like) remaining attached to the payload 10 or otherwise being separated from the device 200 after release of the payload 10. In other words, in some embodiments, only the payload 10, and no other component, is released from the device 200 during delivery of the payload 10. The device 200 can then be optionally returned, e.g., via the drone, to for example a loading or distribution center, and can be loaded with another payload so that another the delivery and drop process can be executed or repeated.

Figure 11:
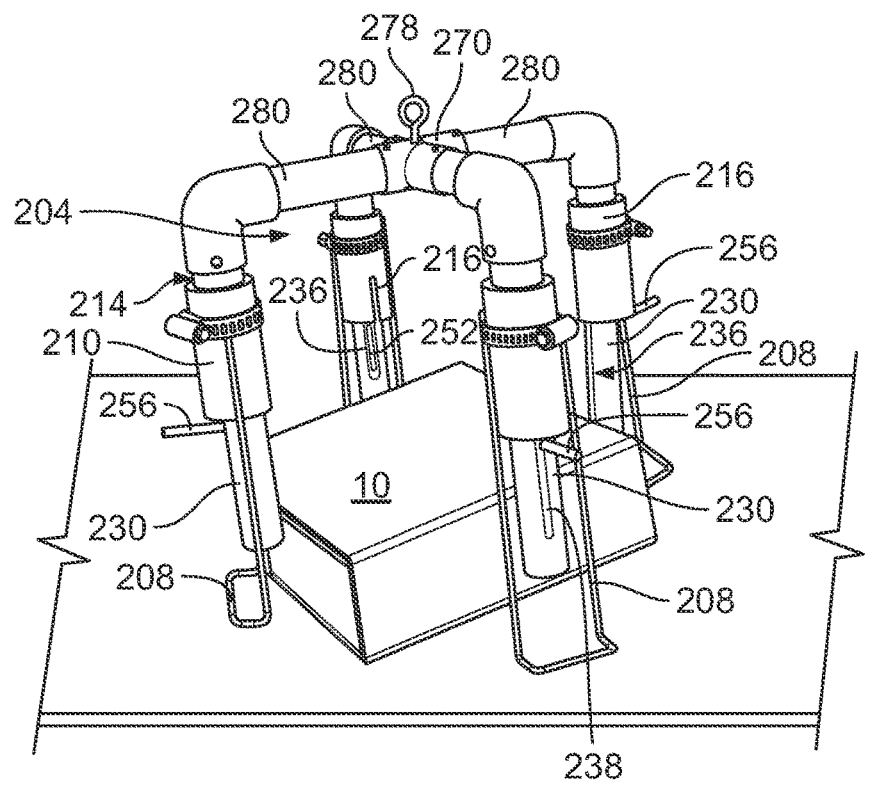

FIGS. 8-11 depict a payload release sequence, with the payload 10 retained in the device 200 shown in FIG. 8, with footings 208 of the device 200 contacting an exterior surface 20 thereby initiating movement of the collars 210 towards their second positions and the rigid rods 250 towards their second positions shown in FIG. 9, with the collars 210 and rigid rods 250 in an intermediate position between their first positions and their second positions shown in FIG. 10, and with the collars 210 and rigid rods 250 in their respective second positions and the payload released from the volume 204 shown in FIG. 11.

In yet another example, while the tubes 130 and rods 190, or the tubes 230, are shown as being substantially equidistantly spaced apart (e.g., such that the volume has a substantially square perimeter shape, from a top view), in other embodiments, a payload delivery and drop device can include tubes and/or retention rods having a different configuration. For example, the device can include tubes and/or retention rods spaced such that the volume has a substantially rectangular perimeter shape (from a top view). In another example, the device can have less than four or more than four such tubes and/or retention rods, which can be spaced such that the volume has a triangular, ellipsoidal, circular, or polygonal perimeter shape (from a top view).

Figure 12:
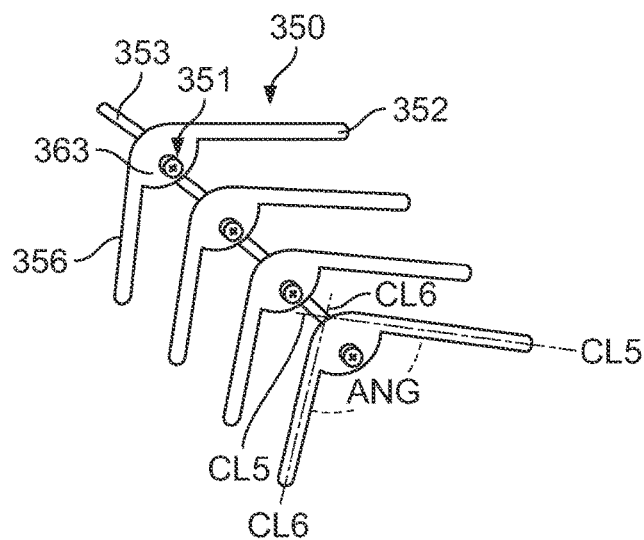
FIGS. 12-13 are perspective views of rigid bars according to embodiments.

In still another example, although the rigid bar 150 has been shown and described herein as having first and second portions with substantially linear centerlines that intersect at a pivot point 151, a pivotable rigid bar or rod can have a different configuration. For example, pivotable rigid bars according to embodiments are shown in FIGS. 12-15. FIG. 12 shows a set of four rigid rods 350. Each rigid rod 350 includes a first end portion 352 and a second end portion 356 each of which is substantially linear, at least proximate to free ends thereof. The first end portion 352 and the second end portion 356 define an interior angle, and the rigid rod 350 includes a pivot plate 363 disposed within the interior angle. The pivot plate 363 can have a substantially concave curvature. The rigid rod 350 is configured to pivot about a pivot point 351 defined by the pivot plate 364. The pivot point 351 is positioned inside an angle ANG of intersection between a centerline CL5 of the first portion 352 of the rigid rod 350 and a centerline CL6 of the second portion 356 of the rigid rod 350. A pivot pin 353 can be disposed through an opening (not shown) at the pivot point 351, such as to couple the rigid rod 350 to an elongate tube as described herein.

Figure 13:
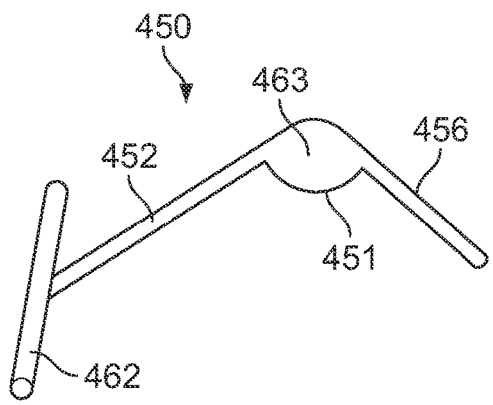
Figure 14:
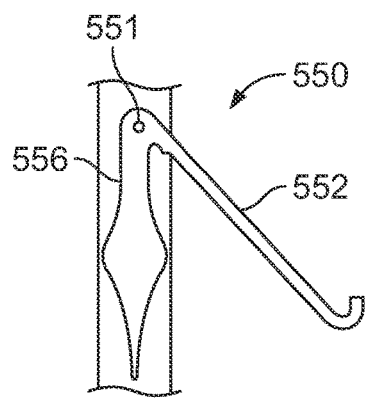
FIGS. 14-17 are schematic views of rigid bars according to embodiments.
Figure 15:
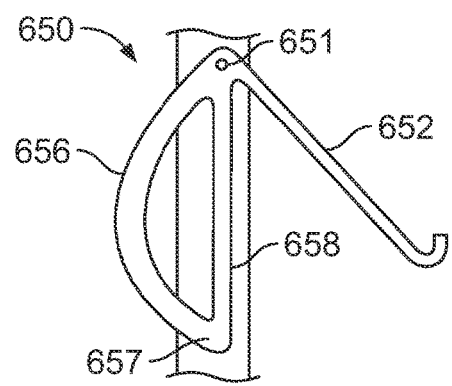

In FIG. 13, a pivotable rigid rod 450 includes a first portion 452 and a second portion 456. In a manner similar to that described with respect to rigid rod 350, the rod 450 can include a pivot plate 463 disposed within an interior angle formed between the first and second portions 452, 456 of the rod 450 and can have a pivot point 451 within the plate 463. A distal end portion 454 of the first portion 452 of the rod 450 includes a crossbar 462 coupled thereto. The crossbar 462 is configured to provide additional support and stability to a payload received in a volume of a payload delivery and drop device, in addition to that provided by the first portion 452 of the rigid rod 450. Although the crossbar 462 is shown in FIG. 13 as being substantially perpendicular to the first portion 452 of the rigid rod 450, in some embodiments, the cross bar can be differently configured, such as in the shape of a C, E, U, V, W, Y, or other suitable shape, including a non-planar shape. Although the retention pin has been shown and described as rigid bars or rods 150, 250, 350, 450 that include substantially linear first and second portions, in some embodiments, one or more of the first or second portions of a rigid rod can be differently configured or the device can include a retention pin differently configured. For example, as shown in FIG. 14, a rigid rod 550 according to an embodiment includes a substantially linear first portion 552 (with an optionally non-linear foot at a free end thereof) and a second portion 556 with a varying thickness along a length thereof, and a pivot point 551 therebetween. In another example, as shown in FIG. 15, a retention pin 650 according to an embodiment can include a rigid first portion 652 that is substantially linear (with an optionally non-linear foot at a free end thereof) and a second portion 656 that is curved (e.g., in a substantially convex curve) and a third portion 658 that connects an end 657 of the second portion 656 to a pivot point 651. The second portion 656 can be configured to elastically deform to permit the collar to slide over the second portion 656 during use, but still have sufficient rigidity to maintain a resistance against an inner surface of the collar when the second portion is elastically deformed and disposed within the collar.

Figure 16:
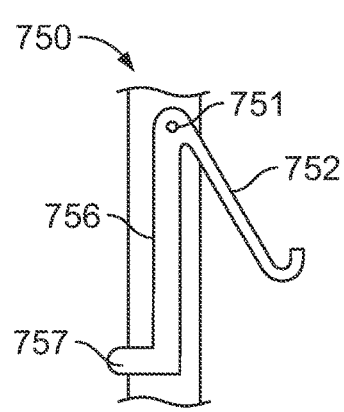
Figure 17:
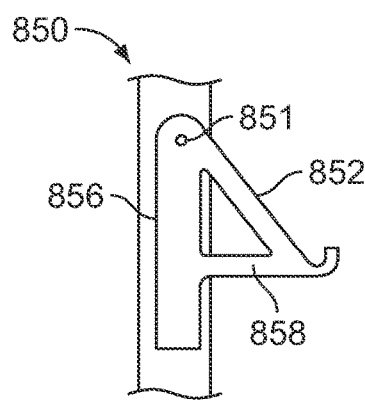

In yet another example, as shown in FIG. 16, a rod 750 can include a pivot point 751, a first portion 752 (with an optionally non-linear foot at a free end thereof) and a second portion 756 that defines a shoulder 757 at its free end. A portion of the shoulder 757 can extend from the second channel (e.g., second channel 138) of the tube (e.g., tube 130) when the rod 750 is in its first position. In still another example, as shown in FIG. 17, a retention pin (or rod) 850 includes pivot point 851, a first portion 852, a second portion 856 that has a greater thickness (or cross-sectional diameter) than the first portion 852, and optionally a third portion 858 that connects the second portion 856 to a free end of the first portion 852. The first portion 852 can optionally have a non-linear foot or hook portion at its free end.

Although the rigid rods (e.g., rigid bars or rods 150, 250, 350, 450, 550, 650) have been shown and described herein as including a first portion and a second portion, each having a length, in other embodiments, one or both of the first portion and the second portion of the rigid rod can have a different (longer or shorter) length that the first and second portions described herein, and the first portion can have a different (longer or shorter) length than the second portion.

Figure 18:
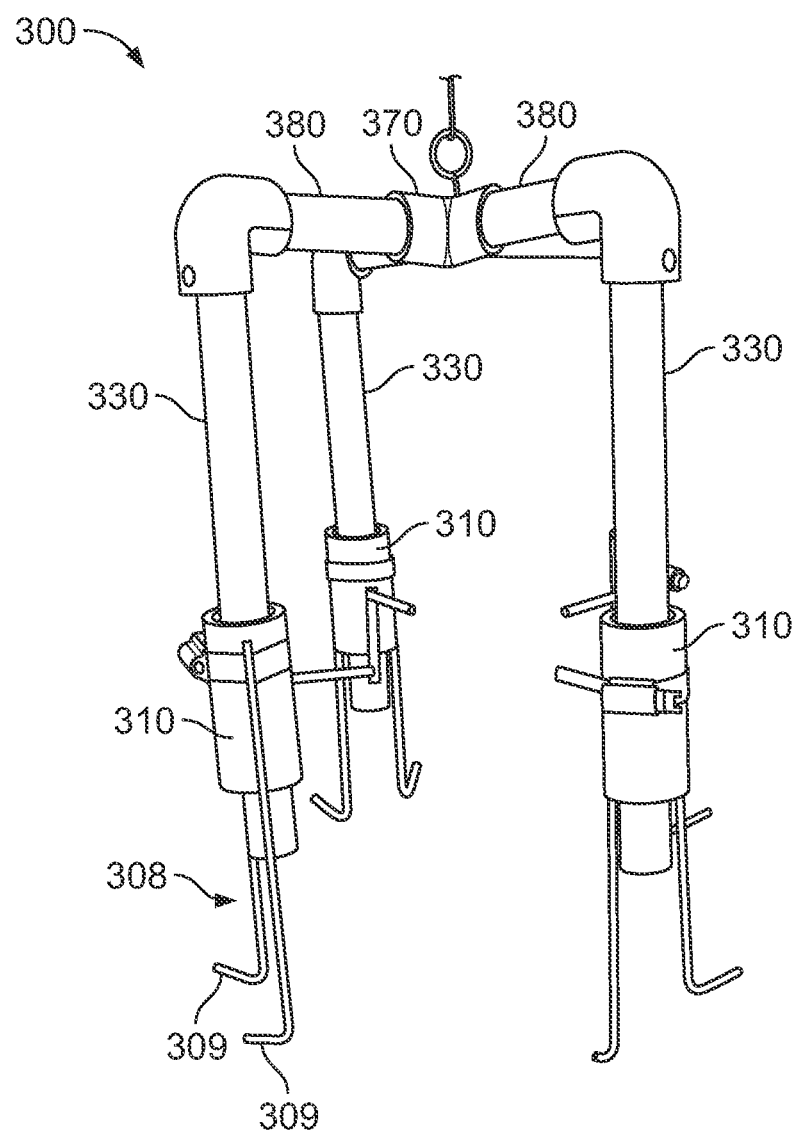
FIG. 18 is a front perspective view of an apparatus according to an embodiment.
Figure 19:
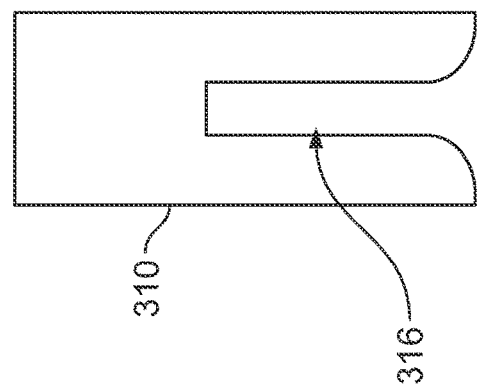
FIG. 19 is a schematic front view of a portion of the apparatus of FIG. 18.
Figure 21:
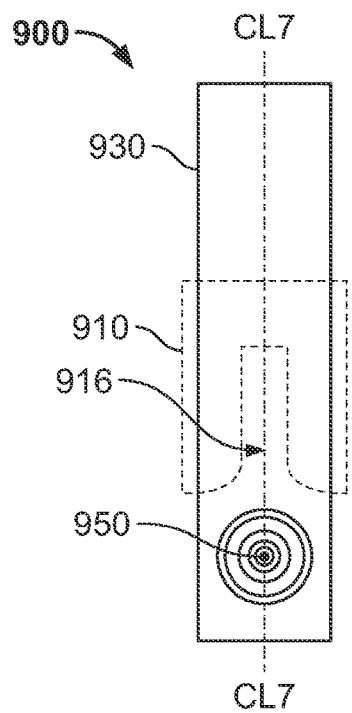
FIGS. 21 and 22 are front and rear views of a portion of an apparatus according to an embodiment.
Figure 22:
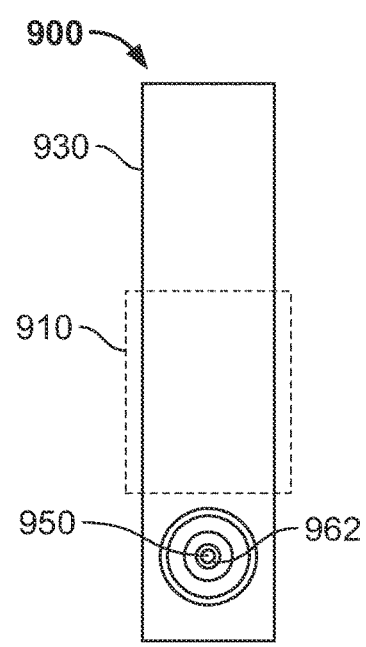
Figure 23:
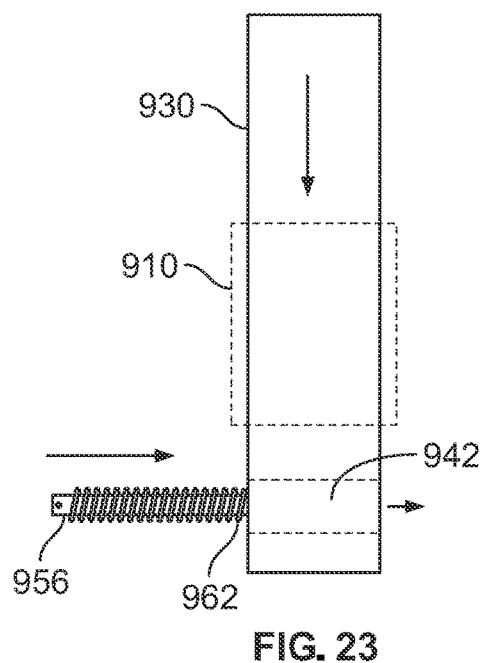
FIGS. 23 and 24 are side views of the portion of the apparatus of FIG. 21 in a first configuration and a second configuration, respectively.
Figure 24:
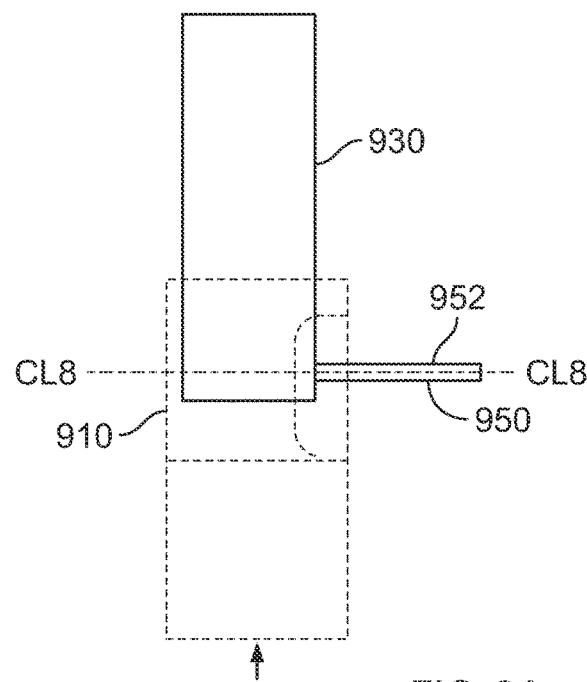
Figure 25:
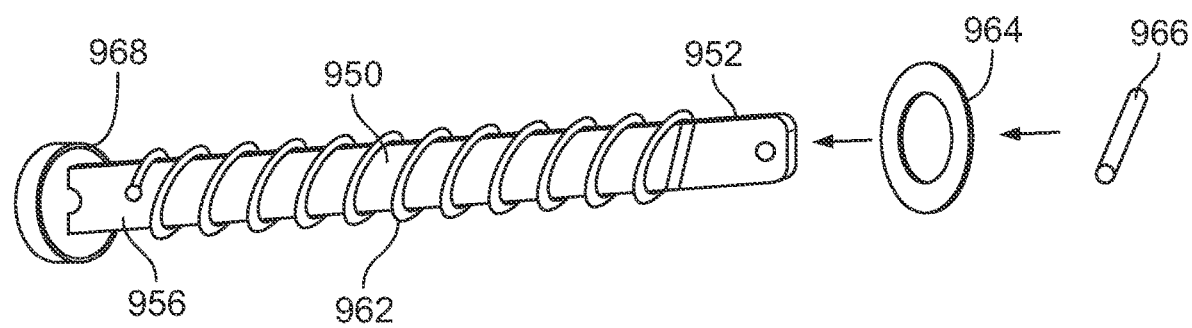
FIG. 25 is an exploded view of a portion of the apparatus of FIG. 21.

Although the footing 108, 208 has been shown and described herein as being a substantially continuous rod coupled at opposing ends thereof to the collar 110, 210, in other embodiments, a payload delivery and drop device can include a footing that is differently configured. For example, referring to FIGS. 18-20, a payload delivery and drop device 300 according to an embodiment is shown. The device 300 can include features similar in many respects, or identical to, features of other devices described herein (e.g., device 100, 200), and so the features of device 300 are not described in detail herein. The payload delivery and drop device 300 includes a hub 370, a set of radially extending arms 380, a set of elongate tubes 330 extended distally from the arms 380, a collar 310 defining a lumen 314 within which a portion of the tube 330 is received and a channel 316, and a rigid bar 350 pivotally coupled to the tube 330 for selectively retaining a payload to the device 300, as described with respect to other devices herein. The device 300 includes a footing 308 coupled to the collar 310. The footing 308 is shown as including two elongate rods, a proximal end of each of which is coupled to an outer surface of the collar 310 via a flexible clamp (or the like) (see, e.g., FIG. 20) and a distal end of each of which is bent to form a foot 309 configured to contact the exterior or delivery surface. Although each collar 310 is shown and described as including a footing 308 having two elongate rods with feet 309, in other embodiments, the footing can include one rod with a foot, or three or more rods.

Although the device 100 has been shown and described herein as including a magnet 142 configured to influence the rigid rod 150 towards its second position, in other embodiments, the device can be differently configured. For example, in some embodiments, a device can include a spring configured to bias or return the rigid rod to its first position absent a retaining force.

Although the devices herein (e.g., device 100, 200, 300) have been shown and described herein as including a retention pin (e.g., a rigid bar or rod) with a first portion that is non-parallel to a second portion thereof, in other embodiments, a device according to an embodiment can have a retention pin that is differently configured. For example, referring to FIGS. 21-31, a device 900 according to an embodiment is configured to releasably receive a payload 10 within a volume (not shown) defined by the device. The volume can be collectively defined in part, for example, by one or more elongate tubes 930, one or more collars 910 moveably disposed about the one or more elongate tubes 930, and one or more retention pins (which can be or include, for example, rigid bars or rods) 950. The device 900 can be similar or identical in many respects, and include one or more features similar or identical in many respects, to other devices described herein (e.g., device 100, 200 300). As such, many features of the device 900 are not shown or described in detail herein.

The retention pin 950 includes a first end portion 952 and a second end portion 956, and can be substantially linear between its second end portion 956 and its first end portion 952. The retention pin 950 can be at least partially disposed within a lumen (not shown) of the tube 930, which lumen can be extended along at least a portion of the centerline of the tube, such that a centerline CL8 of the retention pin 950 is non-parallel to (and, optionally, transverse or orthogonal to) a centerline CL7 of the tube 930. In some embodiments, the tube 930 also or alternatively defines a lumen 942 that is non-parallel to (and, optionally, transverse or orthogonal to) the centerline CL7 of the tube 930. This lumen 942 can be coaxial with the retention pin 950.

The retention pin 950 can include a spring 962 disposed about at least a portion of the retention pin 950 between its first and second end portions 952, 954. The spring 962 can be coupled to the retention pin 950, for example to at least one of the first or second end portion 952, 954 of the retention pin 950. The spring 962 can be disposed about the retention pin 950 between a rubber wheel 968 coupled to the second end portion 956 of the retention pin and a washer 964 coupled to the first end portion 952 of the retention pin 950 to keep the spring 962 disposed on the retention pin 950. In this manner, the spring 962 can move freely about the retention pin 950 without the spring being removed from being disposed about the retention pin 950. The rubber wheel 968 can be coupled to the second end portion 956 of the retention pin 950, for example, such that the rubber wheel 968 overlays an end face of the second end portion 956 of the retention pin 950 or such that the rubber wheel 968 is disposed about the second end portion 956 of the retention pin 950. In this manner, the second end portion 956 is prevented from being fully withdrawn into or through the tube 930 during use, as described in more detail herein. The washer 964 and a retaining pin 966 configured to couple the washer 964 to the retention pin 950 can be coupled to the first end portion 952 of the retention pin 950. The washer 964 and pin 966 collectively operate to prevent the first end portion 952 of the retention pin 950 from being withdrawn fully into or through the tube 930 during use, as described in more detail herein.

The retention pin 950 is moveable with respect to the tube 930. For example, the retention pin 950 has a position (e.g., a first position) (see, e.g., FIG. 24) in which the second end portion 956 of the pin is substantially disposed within the tube 930 (and/or lumen 942) and the first end portion 952 of the retention pin 950 is extended from (disposed outside of) the tube 930 (and/or lumen 942) on a first side of the tube 930, and another (e.g., second) position (see, e.g., FIG. 23) in which the second end portion 956 of the retention pin 950 is extended from (disposed outside of) a second side of the tube 930 (and/or lumen 942) and the first end portion 952 of the retention pin 950 is substantially disposed within the tube 930 (and/or lumen 942).

When the retention pin 950 is in its first position, the spring 962 is in a compressed state. For example, the spring 962 can be compressed between the rubber wheel 968 and the tube 930. When the retention pin 950 is in its second position, the spring 962 disposed about the retention pin 950 is in a substantially uncompressed state. When the spring 962 is in the substantially uncompressed state, for example, the spring can be uncompressed or compressed slightly, such as to an extent that the retention pin 950 does not move from its second position towards its first position absent application of an external force. The spring 962 can be biased towards the uncompressed state. In this manner, when the retention pin 950 is in its first position, the spring 962 causes the retention pin 950 to move to its first position in the absence of (or upon removal of) a force retaining the retention pin 950 in its first position. As such, the retention pin 950 is biased towards its second position.

When the retention pin 950 is in its first position, the first end portion 952 of the retention pin 950 defines a lower boundary of the volume of the device 900. As such, during use, the first end portion 952 of the retention pin 950 can at least partially retain the payload 10 to the apparatus 900, e.g., within the volume (which, for example, is to the right of the tube 930 and collar 910 and also above the retention pin 950 in the views shown in FIGS. 24 and 28), when the retention pin 950 is in the first position.

The retention pin 950 is moved to its first position by pushing the second end portion 956 towards the second side of the tube 930 and/or pulling the first end portion 952 of the retention pin 950 away from the first side of the tube 930. A collar 910 that is disposed about and slideably moveable with respect to the tube 930 can be moved into a first position in which a wall portion of a second side portion of the collar 910 overlays the second end portion 956 of the retention pin 950 and the rubber wheel 968. In this manner, the collar 910 in its first position prevents the spring from decompressing and moving the retention pin 950 to its second position, thereby retaining the retention pin 950 in its first position. A first side portion of the collar 910 defines a channel 916. The first end portion 952 of the retention pin 950 extends through the channel 916 of the collar 910 (see, e.g., FIGS. 28-29) when the retention pin 950 is retained in its first position by the collar 910.

Figure 26:
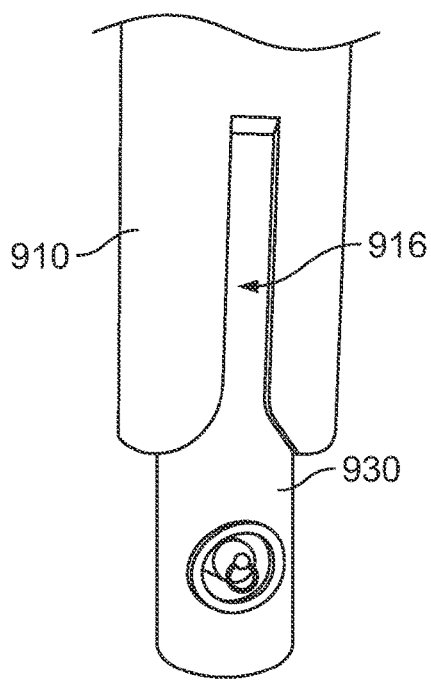
FIGS. 26 and 27 are side opposing views of the portion of the apparatus of FIG. 21 with a collar portion of the apparatus in a second position, a retention pin of the apparatus in a second position, and a spring in an uncompressed state.
Figure 27:
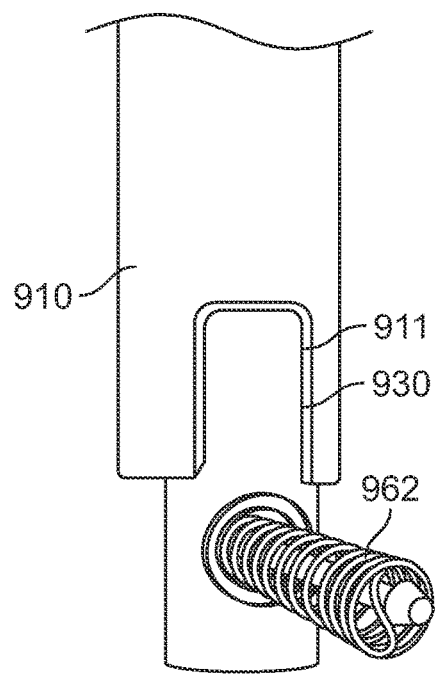
Figure 28:
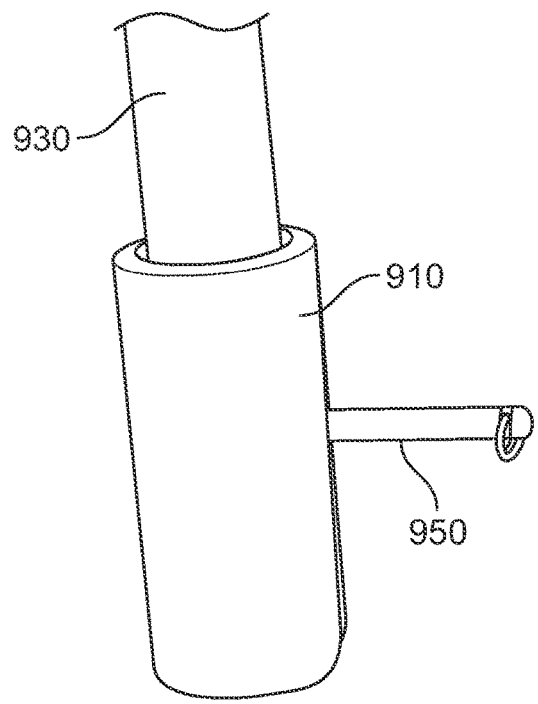
FIGS. 28 and 29 are side and front views, respectively, of the portion of the apparatus of FIG. 21 with the collar portion in a first position, the retention pin in a first position, and the spring (not shown) in a compressed state.
Figure 29:
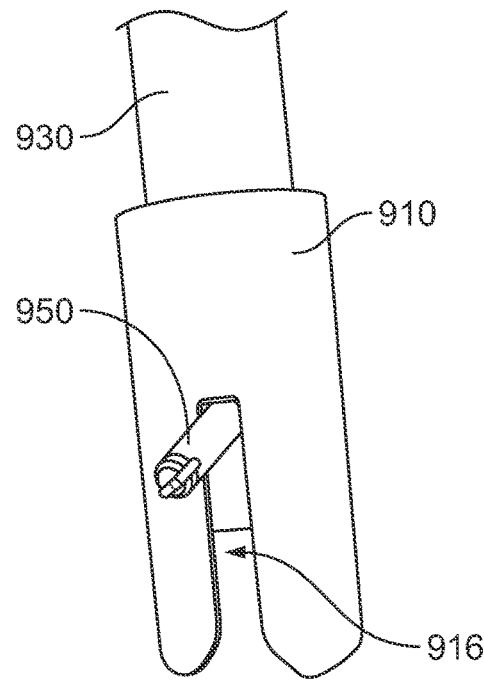
Figure 30:
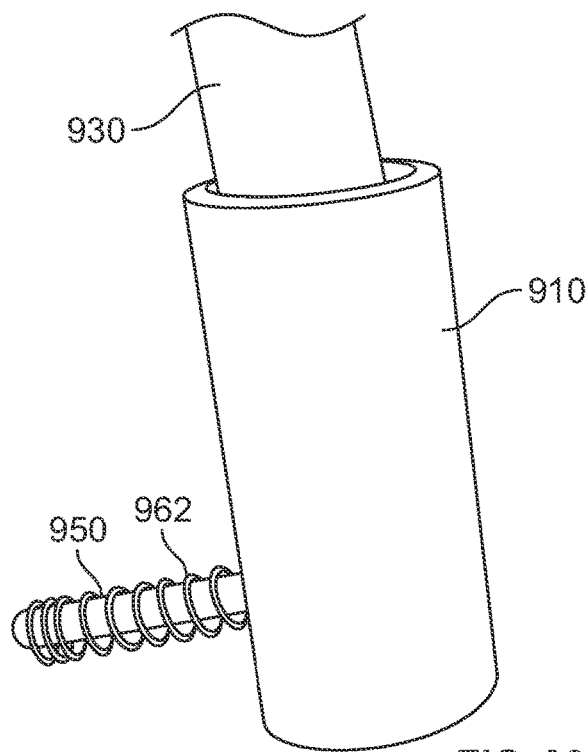
FIGS. 30 and 31 are side and front views, respectively, of the portion of the apparatus of FIG. 21 with the collar portion in a third position between its first position and its second position, the retention pin in its second position, and the spring in an uncompressed state.
Figure 31:
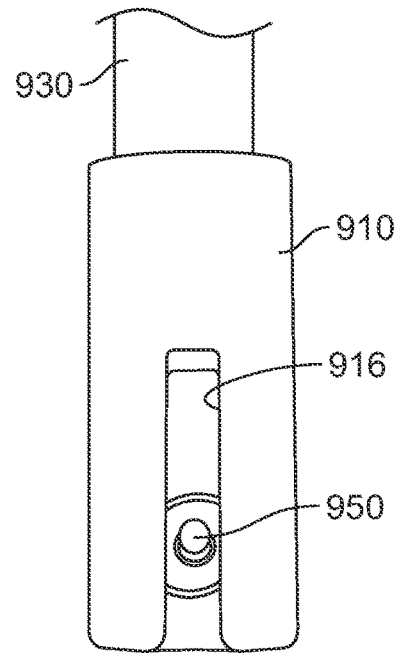

In use, during delivery of a payload by the device 900, the collar 910 is moved in a proximal direction from its first position towards a second position in which the collar 910 is proximally spaced apart from the retention pin 950 and/or lumen 942 (see, e.g., FIGS. 26-27). In some embodiments, the collar 910 can be moved from its first position to a third position between its first and second positions (see, e.g., FIGS. 30-31) with respect to the tube 930, during release of the payload. The collar 910 can be moved from its first position to or towards its second position or its third position in any suitable manner described herein, such as with respect to collars 110, 210 310. In each of the second and third positions, the wall portion of the collar 910 no longer overlays the rubber wheel 968 and/or second end portion 956 of the retention pin 950, thereby permitting the spring 962 to move to its uncompressed state and the retention pin 950 to also move to its second position (e.g., and thereby release the payload).

The collar 910 can defined a notched or cut-out portion 911 on the second side portion of the collar 910, as shown in FIG. 27, though which the second end portion 956 of the retention pin 950 and the spring 962 can be extended when the retention pin 950 is moved to its second position and the collar 910 is in its third position. In its third position, a wall portion of the collar 910 can be disposed about a portion of the tube 930 defining the lumen 942, but not simultaneously overlay the rubber wheel 968 and/or second end portion 956 of the retention pin 950. Thus, the notched portion 911 enables the retention pin 950 to move from its first position to its second position, without the entire length of the collar 910 having to be moved proximally away from the retention pin 950. In other words, because of the notched portion 911 of the collar 910, the collar 910 need not be moved fully from its first position to its second position to permit the spring 962 to cause the retention pin 950 to move to its second position, thereby releasing the payload.

Although device 900 is described as including a spring 962, in some embodiments, a device according to an embodiment can include both a magnet and a spring, as described herein, or neither.

Although devices herein (e.g., device 100, 200, 300) have been shown and described herein as including a hub (e.g., hub 170, 270, 370) and radially extending arms (e.g., arms 180, 182, 280, 380), in other embodiments, the device can be differently configured. For example, in some embodiments, a payload delivery and drop device can include a hub in the form of a plate, ring, square, rectangle, or other polygon (each having a solid profile in some embodiments, and each having an opening inside the outer perimeter in other embodiments). In some embodiments, the hub has a perimeter shaped and sized to permit the tubes (e.g., tubes 130, 230, 330) and/or retention rods (e.g., retention rods 190) to be directly coupled to the hub. In this manner, for example, a device can be devoid of arms that extend radially from the hub.

The devices described herein, and various components thereof, can be constructed of any suitable material. For example, in some embodiments, the collar, tube, arm, hub, or other portion of a device herein can be constructed of nylon or another suitable material.

The specific configurations of the various components described herein can also be varied. For example, the size and specific shape of the various components can be different from the embodiments shown, while still providing the functions as described herein. Additionally, the relative size of various components of the devices shown and described herein with respect to the size of other components of the devices are not necessarily to scale.

For example, although the tubes and collars are each shown and described herein as being substantially cylindrical, in other embodiments, however, a tube and/or collar can have any suitable perimeter shape that permits the collar to translate, or move with respect to the tube, as described herein for automatic release of the rigid bar from its first position to its second position. For example, the tube and/or collar can have an elliptical, square, rectangular, or polygonal perimeter shape, which shape can, for example, limit rotational movement between the collar and the tube.

Similarly, where methods and/or events described above indicate certain events and/or procedures occurring in certain order, the ordering of certain events and/or procedures may be modified. While the embodiments have been particularly shown and described, it will be understood that various changes in form and details may be made.

What is claimed is:

1. A method, comprising:
coupling a rigid bar of a payload delivery apparatus to an elongate, rigid tube of the payload delivery apparatus such that the rigid bar is movable with respect to the elongate, rigid tube from a first position to a second position, the rigid bar having a first portion and a second portion different from the first portion, the first portion of the rigid bar configured to at least partially retain a payload to the apparatus when the rigid bar is in its first position, the rigid bar configured to at least one of (1) permit the payload to be received by the apparatus or (2) permit the payload to be released from the apparatus, when the rigid bar is in its second position; and
disposing a collar about at least a portion of the elongate, rigid tube, the collar defining a lumen, the collar being slidably moveable with respect to the elongate, rigid tube from a first position in which the collar restrains movement of the rigid bar to a second position in which the collar does not restrain movement of the rigid bar,
the rigid bar configured to automatically move from its first position to its second position in response to the collar not restraining the rigid bar.

2. The method of claim 1, further comprising:
retaining, after the disposing, the rigid bar in the first position with the collar.

3. The method of claim 1, wherein the second portion of the rigid bar is disposed within the lumen of the collar when the rigid bar is in its first position and the collar is in its first position.

4. The method of claim 1, wherein at least a portion of the second portion of the rigid bar is disposed exterior to the lumen of the collar when the rigid bar is in its second position such that a centerline of the second portion of the rigid bar is substantially non-parallel to a centerline of the lumen of the collar,
the collar configured to move from its first position to its second position automatically in response to a force produced by a portion of the apparatus upon contacting a surface external to the apparatus.

5. The method of claim 1, wherein:
the rigid bar includes a pivot point between the first portion of the rigid bar and the second portion of the rigid bar, and
the coupling includes pivotally coupling the pivot point of the rigid bar to the elongate, rigid tube.

6. The method of claim 1, further comprising:
sliding the collar with respect to the elongate, rigid tube from the first position of the collar to the second position of the collar.

7. The method of claim 1, further comprising:
positioning, before the coupling, a pivot point of the rigid bar at least partially within the lumen of the elongate, rigid tube,
the pivot point being disposed between the first portion of the rigid bar and the second portion of the rigid bar.

8. The method of claim 1, wherein:
the rigid bar is a first rigid bar from a plurality of rigid bars,
the elongate, rigid tube is a first elongate, rigid tube from a plurality of elongate, rigid tubes, and
the collar is a first collar from a plurality of collars,
the method further comprising:
coupling a second rigid bar of the payload delivery apparatus to a second elongate, rigid tube of the payload delivery apparatus such that the second rigid bar is movable with respect to the second elongate, rigid tube from a first position to a second position, the second rigid bar having a first portion and a second portion different from the first portion, the first portion of the second rigid bar configured to at least partially retain the payload to the apparatus when the second rigid bar is in its first position, the second rigid bar configured to at least one of (1) permit the payload to be received by the apparatus or (2) permit the payload to be released from the apparatus, when the second rigid bar is in its second position; and
disposing a second collar about at least a portion of the second elongate, rigid tube, the second collar defining a lumen, the second collar being slidably moveable with respect to the second elongate, rigid tube from a first position in which the second collar restrains movement of the second rigid bar to a second position in which the second collar does not restrain movement of the rigid bar; and
coupling the first elongate, rigid tube to the second elongate, rigid tube such that the first elongate, rigid tube, the second elongate, rigid tube, the first rigid rod and the second rigid rod collectively define, at least in part, a volume configured to receive the payload.

9. The method of claim 1, further comprising:
contacting a surface external to the apparatus with a portion of the apparatus operatively coupled to the rigid bar; and
removing the restraining by the collar on the rigid bar, the removing being automatic in response to a force produced by the contacting.

10. The method of claim 1, further comprising:
coupling a proximal end portion of the elongate, rigid tube to a hub, the hub configured to be coupled to an aerial vehicle.

11. The method of claim 1, further comprising:
coupling a footing to the collar such that the footing extends distally with respect to the collar, the footing configured to contact an external surface, the footing configured to move the collar from its first position to its second position in response to the contact.

12. A method, comprising:
moving a collar of a payload delivery apparatus from a first position to a second position, the collar defining a lumen having a centerline; and
moving a rigid bar of the apparatus from a first position to a second position in response to the moving the collar, the rigid bar having a first portion and a second portion different from the first portion, the first portion of the rigid bar having a centerline, the second portion of the rigid bar having a centerline different from the centerline of the first portion,
the second portion of the rigid bar being disposed within the lumen of the collar when the rigid bar is in its first position and the collar is in its first position, the centerline of the first portion of the rigid bar being substantially non-parallel to the centerline of the lumen of the collar when the rigid bar is in its first position and the collar is in its first position,
at least a portion of the second portion of the rigid bar being disposed exterior to the lumen of the collar when the rigid bar is in its second position and the collar is in its second position, the centerline of the second portion of the rigid bar being substantially non-parallel to the centerline of the lumen of the collar when the rigid bar is in its second position and the collar is in its second position.

13. The method of claim 12, wherein the moving the collar is automatic in response to a portion of the apparatus operatively coupled to the collar contacting an external surface.

14. The method of claim 12, wherein the moving the collar includes sliding the collar from the first position in which the collar is disposed about at least a portion of an elongate, rigid tube at a first location of the elongate, rigid tube to the second position in which the collar is disposed about at least a portion of the elongate, rigid tube at a second location of the elongate, rigid tube different from the first location of the elongate, rigid tube.

15. The method of claim 12, wherein the rigid bar includes a pivot point between the first portion of the rigid bar and the second portion of the rigid bar, the moving the rigid bar includes pivoting about the pivot point.

16. The method of claim 12, wherein the rigid bar is a first rigid bar from a plurality of rigid bars, the collar is a first collar from a plurality of collars, the method further comprising:
receiving a payload within a volume defined, in part, by the plurality of rigid bars; and
retaining, after the receiving, the payload to the apparatus, the plurality of collars being in their first position to retain the plurality of rigid bars in their first position during the retaining.

17. The method of claim 12, further comprising:
contacting a surface external to the apparatus with a portion of the apparatus operatively coupled to the rigid bar,
the moving the collar being automatic in response to a force produced by the contact.

18. The method of claim 12, wherein the collar defines a channel in fluid communication with the lumen of the collar, the first portion of the rigid bar extends through the channel when the rigid bar is in its first position.

19. The method of claim 12, wherein:
the collar defines a channel in fluid communication with the lumen of the collar,
the collar is slidingly disposed about at least a portion of an elongate, rigid tube,
the elongate, rigid tube defines a lumen, at least a portion of the rigid bar is disposed within the lumen of the elongate, rigid tube,
when the rigid bar is in its first position, the first portion of the rigid bar extends in a first direction through the channel of the collar and the second portion of the rigid bar is substantially disposed within the lumen of the elongate, rigid tube, and
when the rigid bar is in its second position, the first portion of the rigid bar is substantially disposed within the lumen of the elongate, rigid tube, and the second portion of the rigid bar extends through a channel of the elongate, rigid tube in a second direction different than the first direction.

20. The method of claim 12, wherein the apparatus includes:
a hub configured to be coupled to an unmanned aerial vehicle,
a plurality of radially extending arms extended from the hub, and
a plurality of elongate, rigid tubes coupled to the plurality of radially extending arms such that the plurality of elongate, rigid tubes are non-parallel to the plurality of radially extending arms,
the plurality of radially extending arms, the plurality of elongate, rigid tubes, and the first portion of the rigid bar collectively define, in part, a volume,
the method further comprising receiving a payload in the volume.

21. A method, comprising:
disposing a payload within a volume of a payload delivery apparatus, the volume being defined at least in part by a rigid bar of the apparatus, the rigid bar having a first portion and a second portion;
moving, after the receiving, the rigid bar to a first position in which the first portion of the rigid bar at least partially retains the payload to the apparatus; and
moving a collar with respect to the rigid bar such that the second portion of the rigid bar is at least partially disposed within a lumen defined by the collar, the collar configured to prevent the rigid bar from moving to a second position different from the first position when the second portion of the rigid bar is at least partially disposed within the lumen defined by the collar.

22. The method of claim 21, further comprising:
moving, before the receiving, the rigid bar to a second position permitting the payload to be received within the volume.

23. The method of claim 21, wherein the rigid bar includes a pivot point between the first portion of the rigid bar and the second portion of the rigid bar, the moving the rigid bar includes pivoting about the pivot point.

* * * * *